(12) United States Patent
Chi et al.

(10) Patent No.: US 10,495,878 B2
(45) Date of Patent: Dec. 3, 2019

(54) MOBILE TERMINAL AND CONTROLLING METHOD THEREOF

(71) Applicant: LG ELECTRONICS INC., Seoul (KR)

(72) Inventors: Jumin Chi, Seoul (KR); Sukhyun Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 15/570,199

(22) PCT Filed: Nov. 19, 2015

(86) PCT No.: PCT/KR2015/012492
§ 371 (c)(1),
(2) Date: Oct. 27, 2017

(87) PCT Pub. No.: WO2016/175412
PCT Pub. Date: Nov. 3, 2016

(65) Prior Publication Data
US 2018/0136465 A1 May 17, 2018

(30) Foreign Application Priority Data

Apr. 28, 2015 (KR) .................. 10-2015-0059959

(51) Int. Cl.
*G06F 3/01* (2006.01)
*G02B 27/01* (2006.01)
*G06F 3/041* (2006.01)

(52) U.S. Cl.
CPC ....... *G02B 27/0172* (2013.01); *G02B 27/017* (2013.01); *G06F 3/012* (2013.01);
(Continued)

(58) Field of Classification Search
None
See application file for complete search history.

(56) References Cited

U.S. PATENT DOCUMENTS 8,941,561 B1 * 1/2015 Starner .................. G06F 3/012
345/7
10,078,863 B2 * 9/2018 Loganathan ....... G06Q 30/0641
(Continued)

FOREIGN PATENT DOCUMENTS

KR 10-2014-0133640 A 11/2014
KR 10-2015-0024199 A 3/2015

*Primary Examiner* — Joseph R Haley
(74) *Attorney, Agent, or Firm* — Birch, Stewart, Kolasch & Birch, LLP

(57) ABSTRACT

Disclosed are a mobile terminal and a controlling method thereof. The mobile terminal includes a camera for sequentially acquiring a first image for augmented reality (AR), which include at least one object, a display unit for outputting the first image, and a controller for, if an input for selecting a specific object among the at least one object included in the first image is received, storing information related to the selected specific object. If a virtual reality (VR) mode corresponding to the first image is executed, the controller forms and outputs a second image corresponding to the VR mode, based on the stored information. If update information related to the selected specific object is received from an external server, the controller controls a mark change corresponding to the received update information to be marked on the second image.

19 Claims, 15 Drawing Sheets

(52) U.S. Cl.
CPC ............ *G06F 3/013* (2013.01); *G06F 3/0416* (2013.01); *G02B 2027/014* (2013.01); *G02B 2027/0138* (2013.01); *G02B 2027/0178* (2013.01)

(56) References Cited

U.S. PATENT DOCUMENTS

2013/0166408 A1   6/2013  Edwards
2013/0293530 A1  11/2013  Perez et al.
2013/0335301 A1  12/2013  Wong et al.

\* cited by examiner

[Fig. 1]
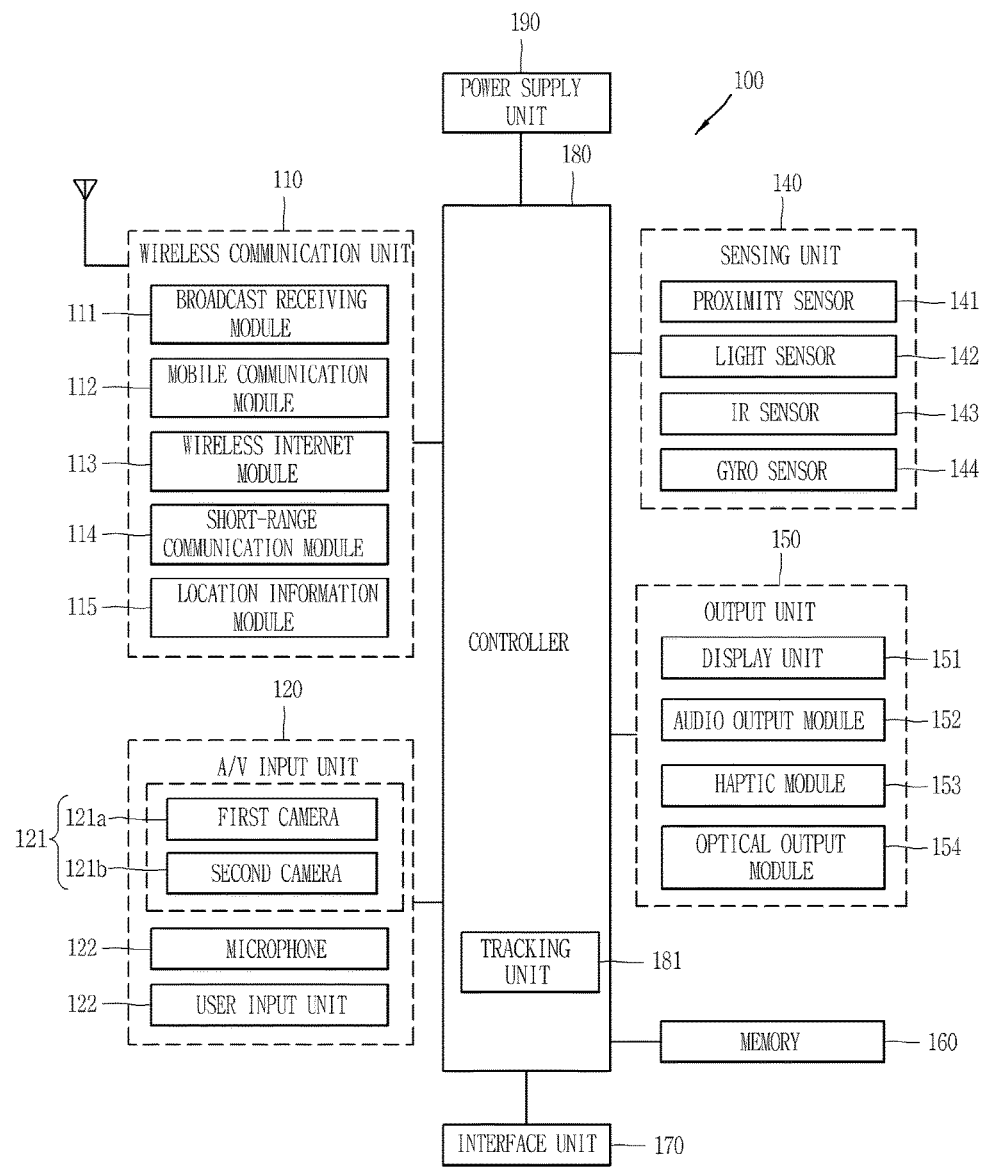

[Fig. 2]
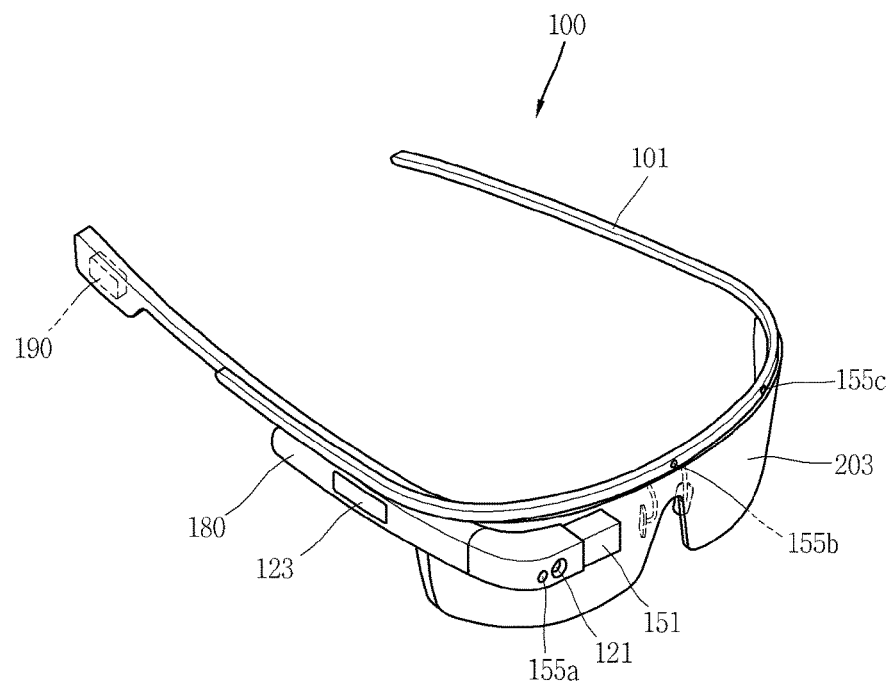
[Fig. 3a]
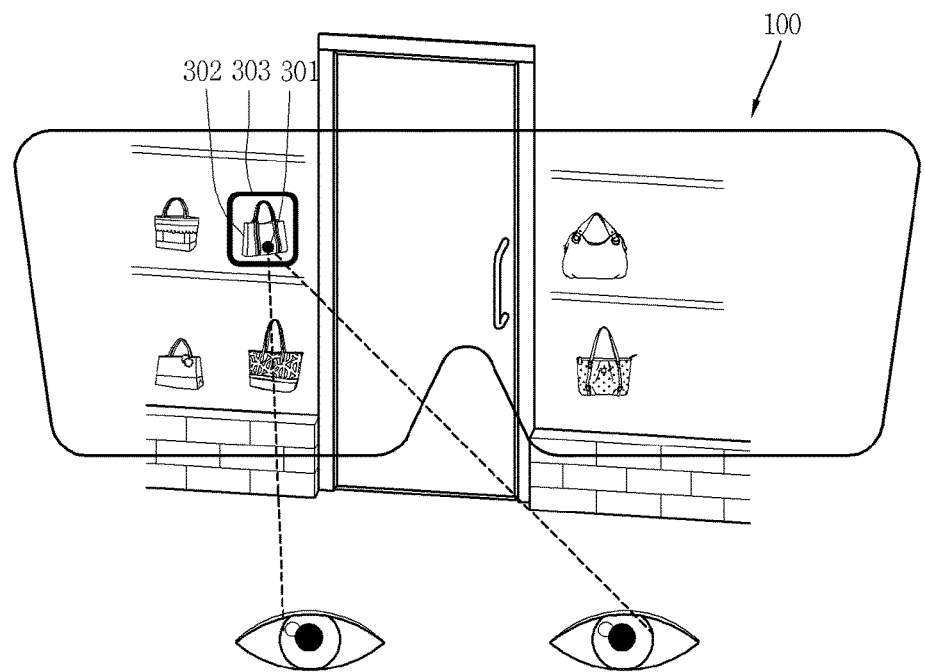

[Fig. 3b]
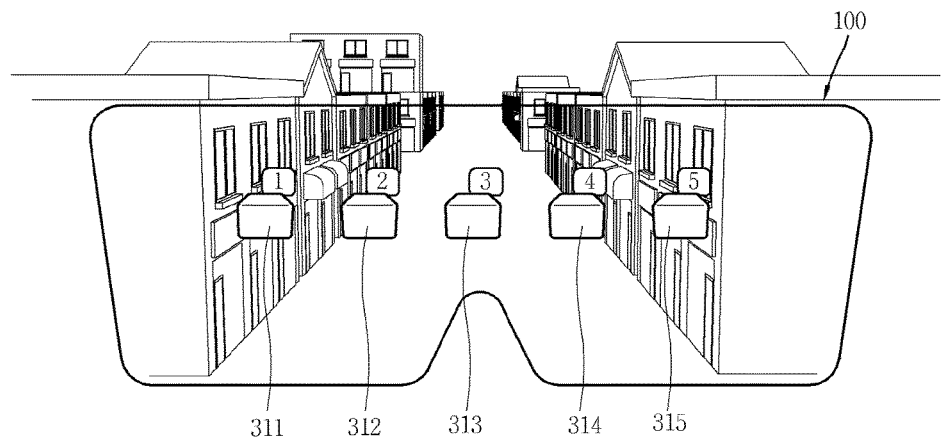
[Fig. 3c]
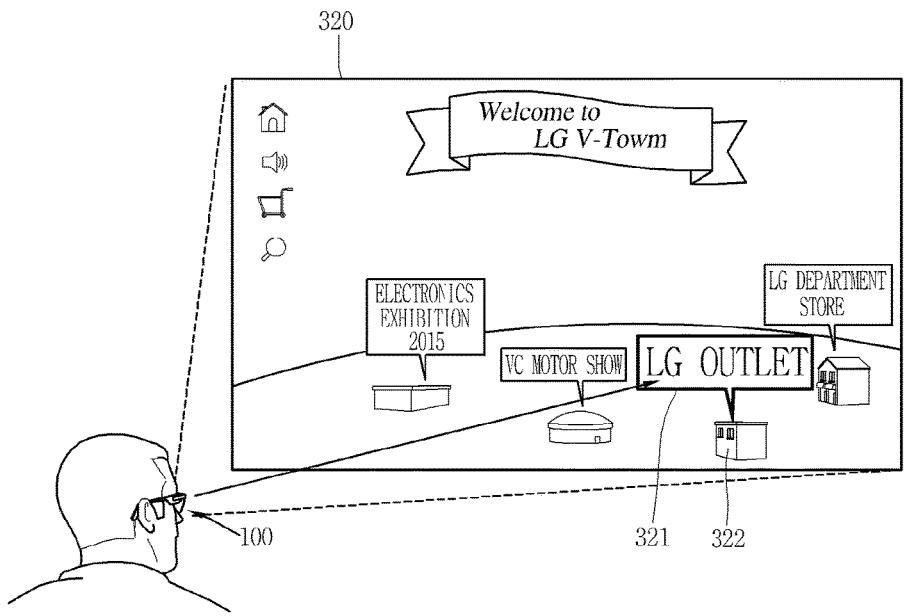

[Fig. 3d]
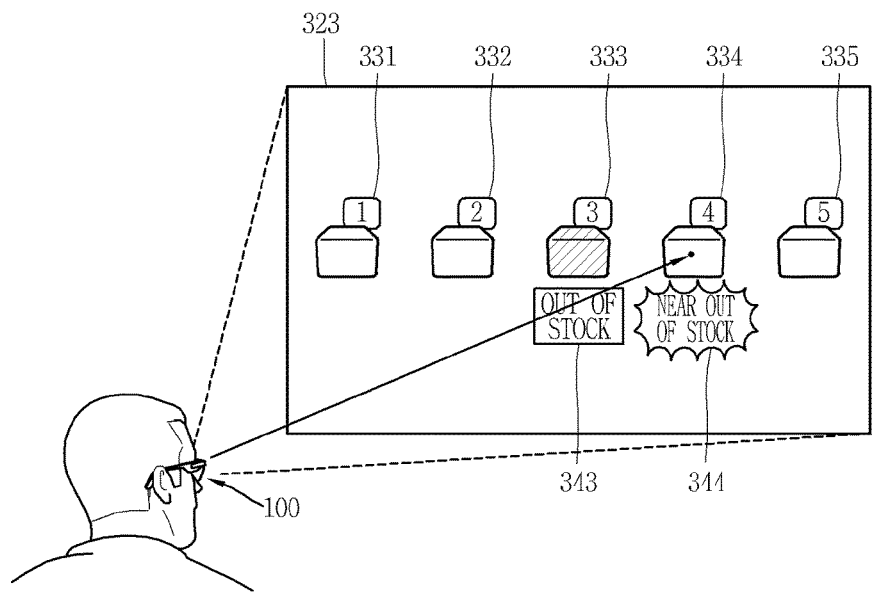
[Fig. 3e]
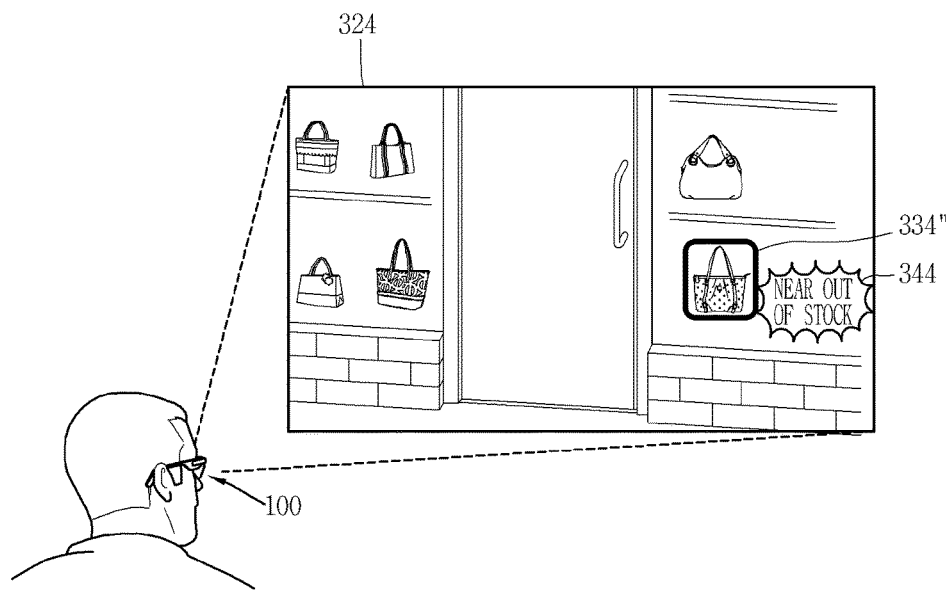

[Fig. 4]
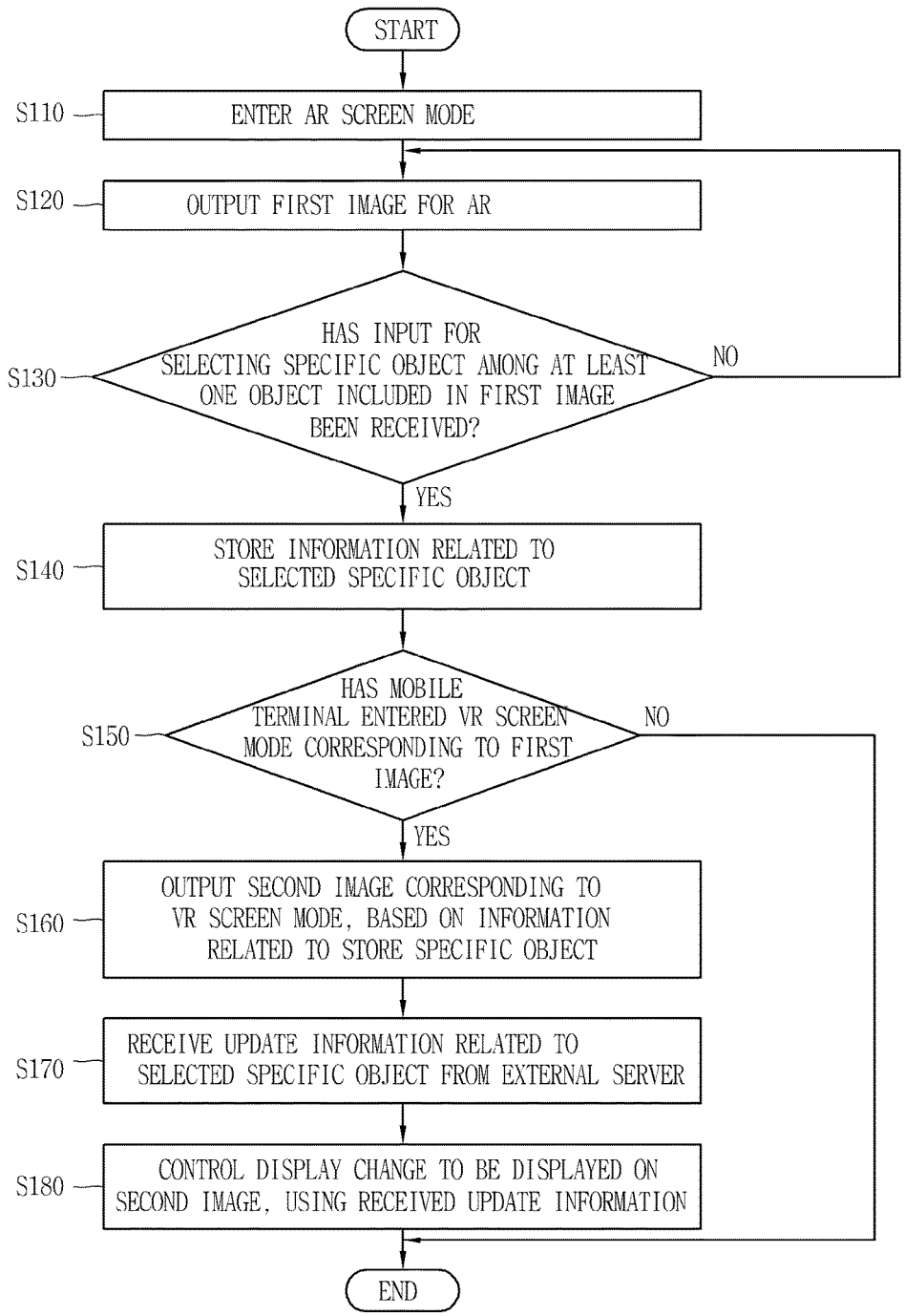

[Fig. 5a]
[Fig. 5b]
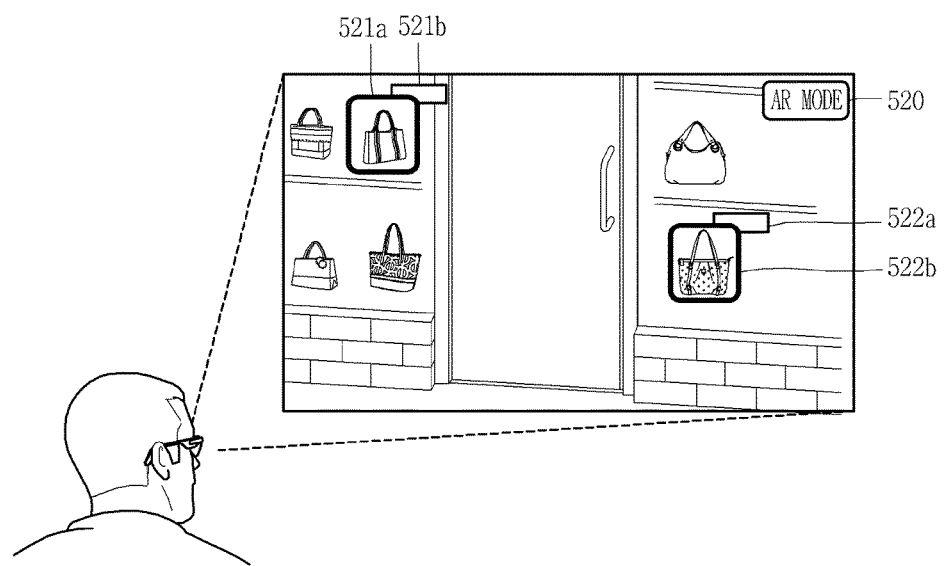

[Fig. 6]
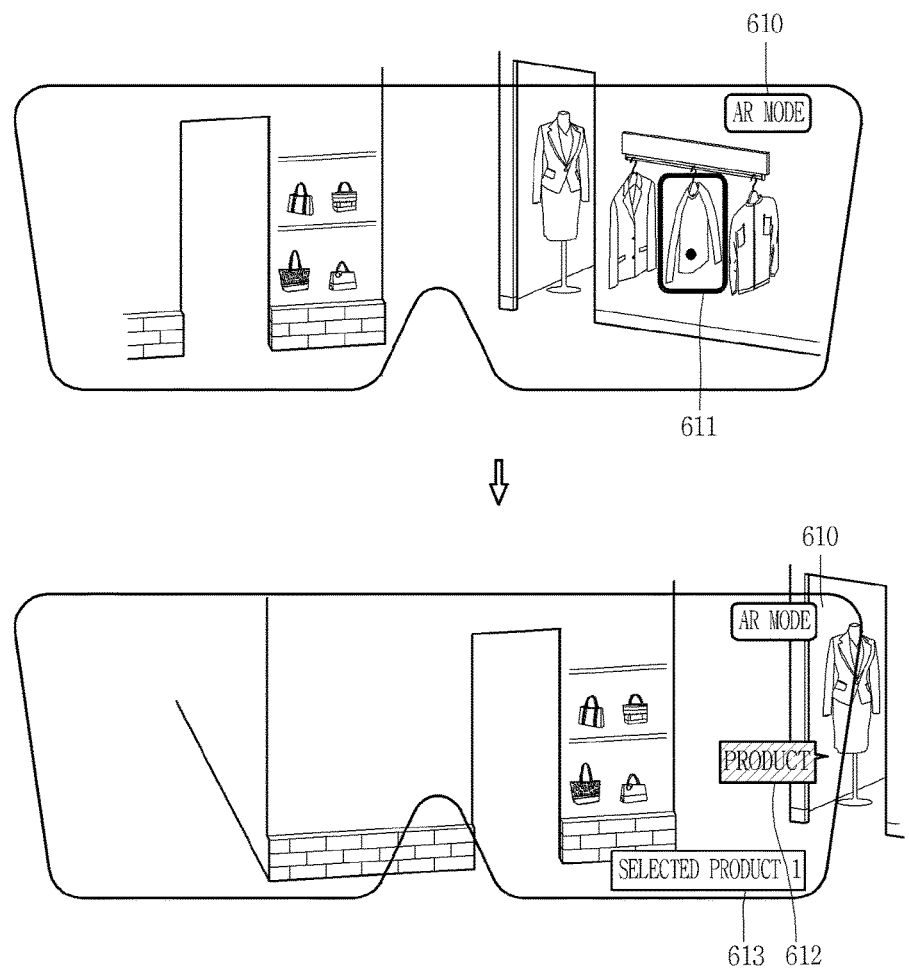

[Fig. 7a]
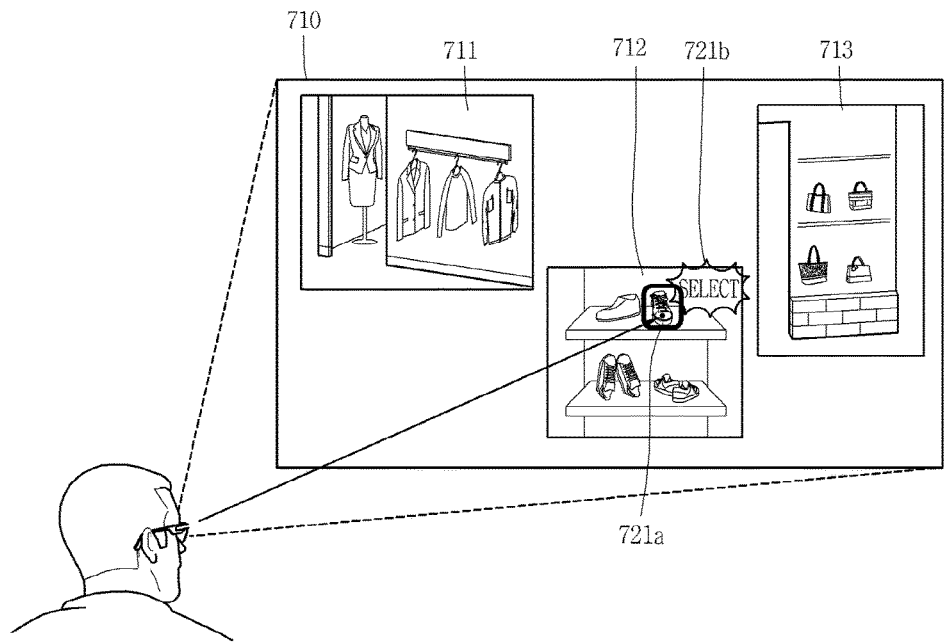

[Fig. 8a]
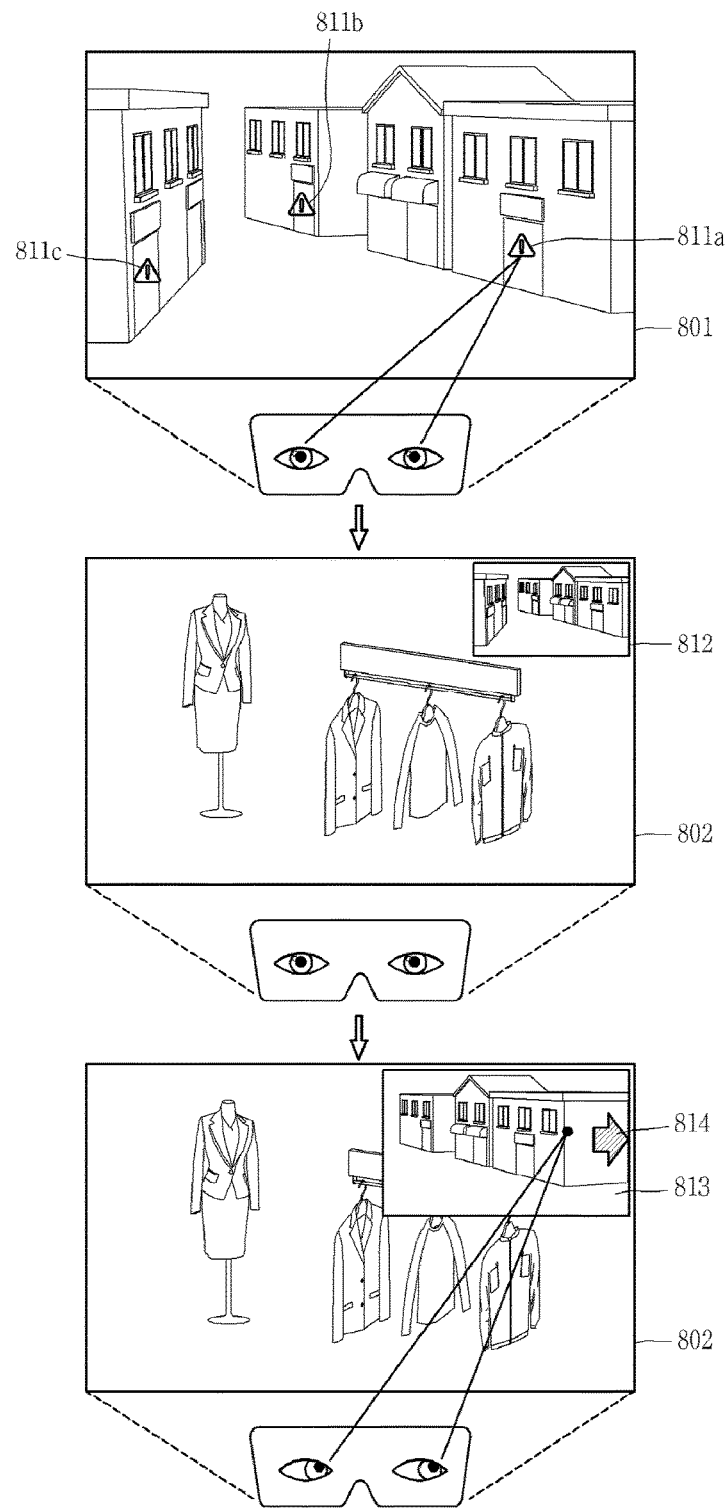

[Fig. 8b]
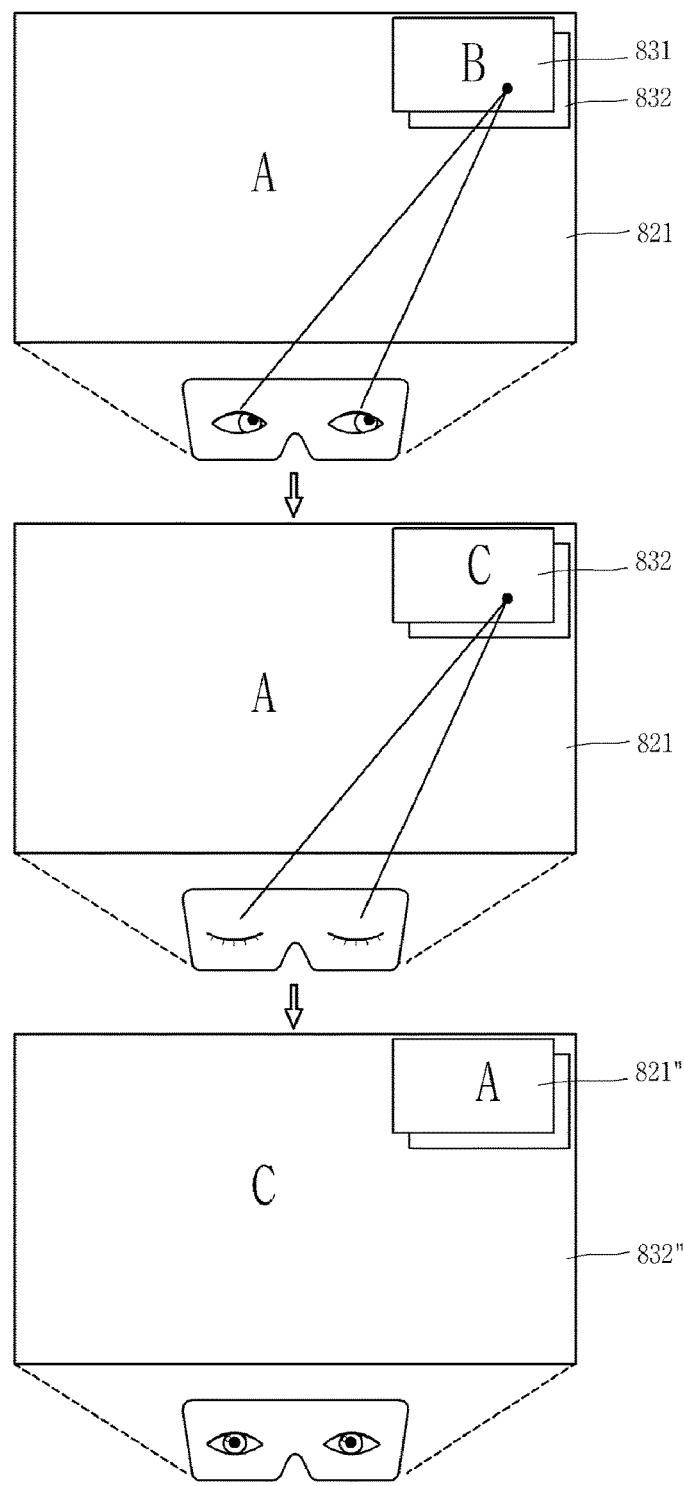

[Fig. 8c]
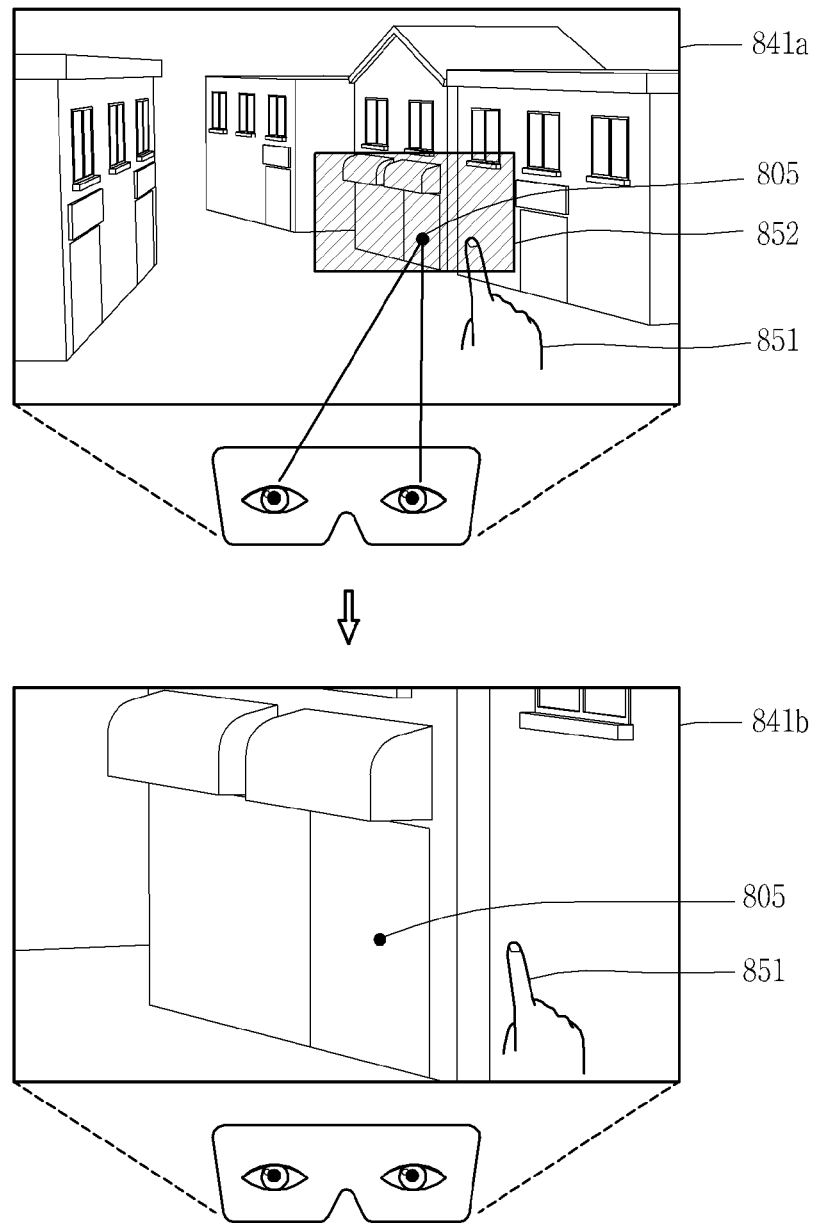

[Fig. 9]
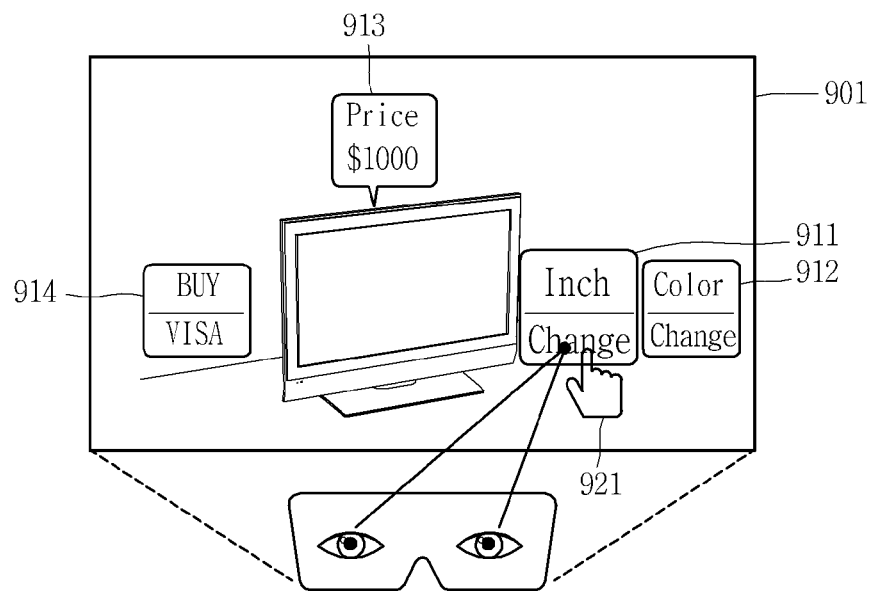
[Fig. 10a]
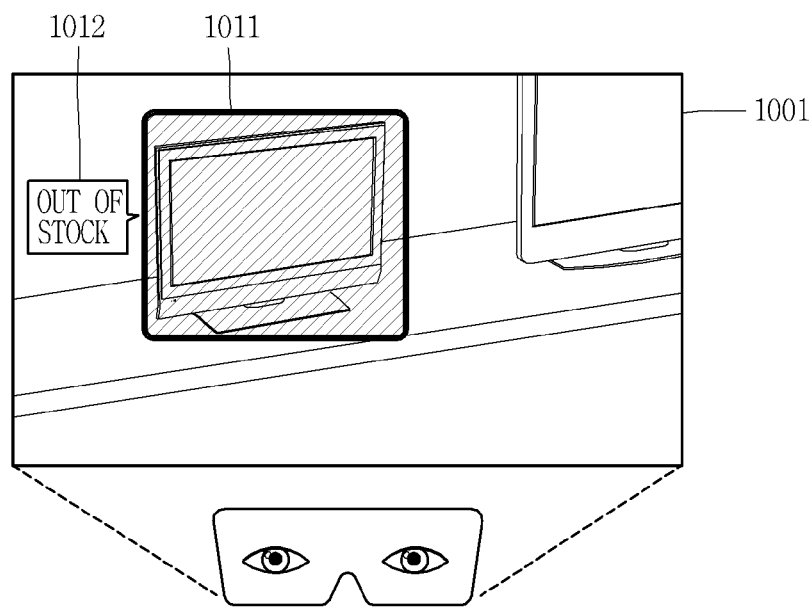

[Fig. 10b]
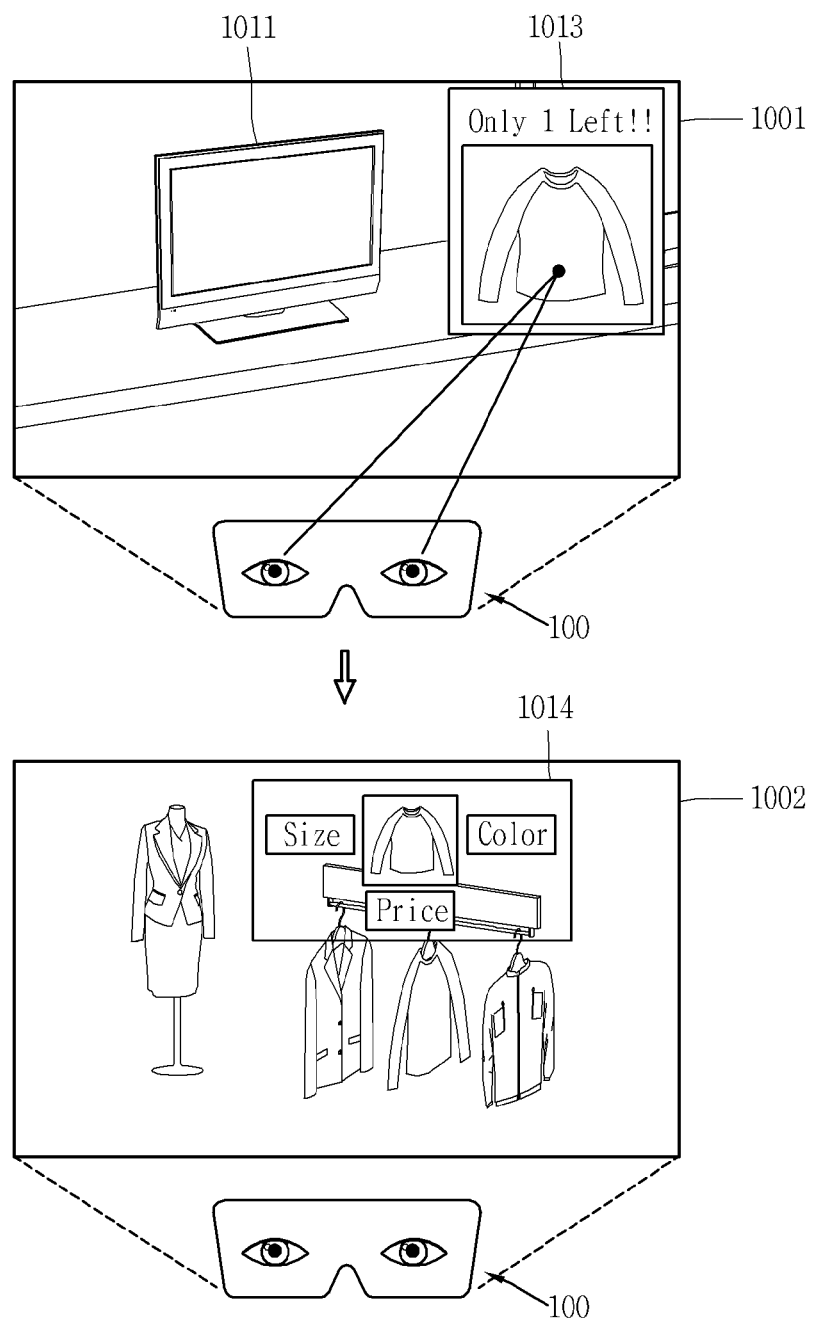

[Fig. 11]
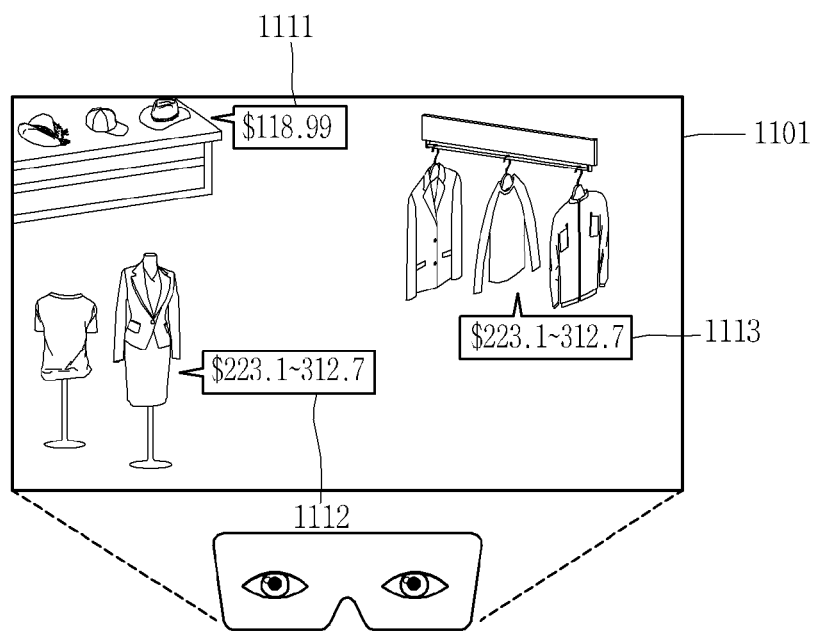

000# MOBILE TERMINAL AND CONTROLLING METHOD THEREOF

CROSS REFERENCE TO RELATED APPLICATIONS

This application is the National Phase of PCT International Application No. PCT/KR2015/012492, filed on Nov. 19, 2015, which claims priority under 35 U.S.C. 119(a) to Patent Application No. 10-2015-0059959, filed in Republic of Korea on Apr. 28, 2015, all of which are hereby expressly incorporated by reference into the present application.

TECHNICAL FIELD

The present disclosure relates to a mobile terminal and a controlling method thereof, and more particularly, to a mobile terminal and a controlling method thereof, in which augmented reality display is possible.

BACKGROUND ART

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software.

Owing to this improvement, augmented reality (AR) technology has recently been applied to mobile terminals and used for various uses. An AR is one field of virtual reality, and refers to a computer graphic technology that combines a virtual object or virtual information with an actual environment, thereby allowing the virtual object or the virtual information to appear as if it exists in an original environment. A screen of the AR, for example, may be displayed using a glass type terminal as an example of a wearable device which a user can wear on a user's body.

Meanwhile, the AR technology generally applied to mobile terminals merely recognizes an actual object captured by a camera in a location-based or marker-based manner and displays, on an image, previously stored AR information corresponding to the recognized object. Therefore, there is a limitation in providing realistic information, and hence the user's availability of AR information is not high.

DISCLOSURE OF INVENTION

Technical Problem

Therefore, an object of the present disclosure is to provide a mobile terminal and a controlling method thereof, in which augmented reality (AR) information is generated based on an object or product in which a user was interested in the past and displayed on a virtual reality (VR) screen, so that it is possible to increase the availability of the AR information.

Another object of the present disclosure is to provide a mobile terminal and a controlling method thereof, in which an object or product in which a user was interested in the past is displayed on a VR screen by reflecting a current state of the object or product, so that it is possible to provide more realistic information.

Still another object of the present disclosure is to provide a mobile terminal and a controlling method thereof, which enable a user to easily and quickly move into various spaces included in a VR screen with realistic feeling.

Solution to Problem

To achieve these and other advantages and in accordance with the purpose of the present disclosure, as embodied and broadly described herein, there is provided a mobile terminal including: a camera configured to sequentially acquire a first image for AR, which include at least one object; a display unit configured to output the first image; and a controller configured to, if an input for selecting a specific object among the at least one object included in the first image is received, store information related to the selected specific object, wherein, if a VR mode corresponding to the first image is executed, the controller forms and outputs a second image corresponding to the VR mode, based on the stored information, and, if update information related to the selected specific object is received from an external server, the controller controls a mark change corresponding to the received update information to be marked on the second image.

If a first input is received, the controller may execute an AR mode for sequentially acquiring the first image by activating a camera provided outside a main body of the mobile terminal. If a second input is received, the controller may terminate the AR mode and executes the VR mode corresponding to the first image.

The mobile terminal may include a tracking unit configured to tack a user's head or user's eyes. The controller may display a corresponding image object by detecting a specific object to which the user's head or eyes are fixed in the first image through the tracking unit. If a third input is received in the state in which the image object is displayed, the controller may select the detected specific object.

If the detected specific object is selected as the third input is received, the controller may control a mark change corresponding to the selection to be marked on the first image.

The main body of the mobile terminal may be formed to be wearable on the user's head or coupled to a means formed to be wearable on the user's head. If a predetermined voice command or wink is sensed in a state in which an input is applied to an input unit provided in the main body of the mobile terminal or the means, the controller may recognize that the third input for selecting the specific object has been received.

If the detected specific object is selected in plurality and if a fourth input is received, the controller may execute a screen mode for comparing the plurality of selected specific objects, and gather and output, on the first image, images corresponding to the plurality of selected specific objects.

The information related to the selected specific object may include at least one of a position at which the selected specific object is located, a user's visiting time, and corresponding product information.

If the VR mode is executed, the controller may arrange image objects marked on the second image, based on at least one of position information of the selected specific object and user's movement information in the first image.

If the VR mode is executed, the controller may activate a camera provided inside the main body of the mobile terminal to tack movement of the user's pupils.

If the VR mode is executed, the controller may mark a visually distinguished indicator around an image object which is to enter a new space among the marked image objects.

In the VR mode, if a predetermined movement of the user's pupils is sensed in a state in which the user's head or eyes are fixed to any one of the image objects, around which the indicator is marked, the controller may control a mark change for notifying that the user has entered a new virtual space to be marked on the second image.

If the VR mode is executed, the controller may sense a user's hand gesture by activating the camera provided outside the main body of the mobile terminal. If any one of the image objects marked on the second image is pointed using a virtual hand image moving along the sensed hand gesture, the controller may provide a preview image of a virtual space corresponding to the pointed image object.

If a predetermined input signal is received in the VR mode, the controller may gather virtual images corresponding to the selected specific object and mark the gathered virtual images on the second image. A notification icon for notifying, in real time, update information related to the selected specific object may be marked together with the virtual images.

In the VR mode, if the user's head or eyes are fixed to any one of the virtual images and if a predetermined movement of the user's pupils is sensed, the controller may control the user to enter a virtual space in which a specific object corresponding to the one virtual image is located, and execute a process for purchasing a product corresponding to the specific object.

If the process for purchasing the product is executed, the controller may perform user authentication, based on at least one of a user's iris scan, a user's eyeball radius, a distance between the user's pupils, and a kappa angle, using the camera provided inside the main body of the mobile terminal.

If the process for purchasing the product is executed, the controller may display option information related to purchase among update information related to a specific object corresponding to the one virtual image, and control the displayed option information to be selected based on movement of the user's pupils.

In the VR mode, if the movement of the user's pupils faces a predetermined direction in a state in which the user enters a virtual space in which a specific object corresponding to the one virtual image is located, the controller may control the user to move, along the sensed direction, to a virtual space in which an object corresponding to another AR image is located.

In the VR mode, when an event related to another virtual image occurs in a state in which the user enters a virtual space in which a specific object corresponding to the one virtual image is located, the controller may control a virtual icon for notifying that the event has occurred to be popped up.

If the user's head or eyes are fixed to the virtual icon and if a predetermined movement of the user's pupils is sensed, the controller may control a current image to move to a virtual space in which a specific object corresponding to the virtual icon is located.

In the VR mode, if the user enters a virtual space in which a specific object corresponding to the one virtual image is located, the controller may display a thumbnail image corresponding to a virtual space which the user previously visited to be overlapped on a current image.

Advantageous Effects of Invention

As described above, in the mobile terminal and a controlling method thereof according to the present disclosure, an image of an object or product in which a user was interested in an actual environment is marked through a VR screen, so that the user can have a re-experience (relive, nacherleben) nacherleben) as if the user revisits a place where the corresponding object or product is located. Also, a current state of an object or product in which the user was interested is reflected in real time and marked on a VR screen, so that it is possible to provide convenience to the user in performing a next operation, e.g., purchase of the product, learning related to the object, etc. Further, the entrance of the user into a new virtual space, the purchase of an object or product, the selection of option information, etc. are made by tracking the user's head or eyes on a VR screen, so that it is possible to provide convenience to the user in a more intuitive input manner.

BRIEF DESCRIPTION OF DRAWINGS

FIG. 1 is an exemplary block diagram illustrating a mobile terminal according to an embodiment of the present disclosure;

FIG. 2 is a view illustrating a glass type terminal as an example of the mobile terminal according to the embodiment of the present disclosure;

FIGS. 3A to 3E are representative conceptual views illustrating a method of displaying an object selected in an augmented reality (AR) mode on a virtual reality screen in the mobile terminal according to the embodiment of the present disclosure;

FIG. 4 is a representative flowchart illustrating a method of displaying an object selected in an AR mode on a virtual reality screen in the mobile terminal according to the embodiment of the present disclosure;

FIGS. 5A and 5B are views illustrating a method of activating an AR mode and a virtual reality mode in the mobile terminal according to the embodiment of the present disclosure;

FIG. 6 is a view illustrating a method of displaying a selected object on an AR screen in the mobile terminal according to the embodiment of the present disclosure;

FIGS. 7A and 7B are views illustrating a method of forming a virtual reality screen based on a user's actual visiting history in the mobile terminal according to the embodiment of the present disclosure;

FIGS. 8A to 8C are views illustrating a method of moving into a virtual space based on a user's visiting history on a displayed virtual reality screen in the mobile terminal according to the embodiment of the present disclosure;

FIG. 9 is a view illustrating a method of selecting optional information related to purchase of a selected object in the mobile terminal according to the embodiment of the present disclosure;

FIGS. 10A and 10B are views illustrating a method of displaying event information related to a current state of a selected object in the mobile terminal according to the embodiment of the present disclosure; and FIG. 11 is a view illustrating a method of marking an AR message related to purchase in a virtual space in which any selected object is not located in the mobile terminal according to the embodiment of the present disclosure.

MODE FOR THE INVENTION

Figure 7B:
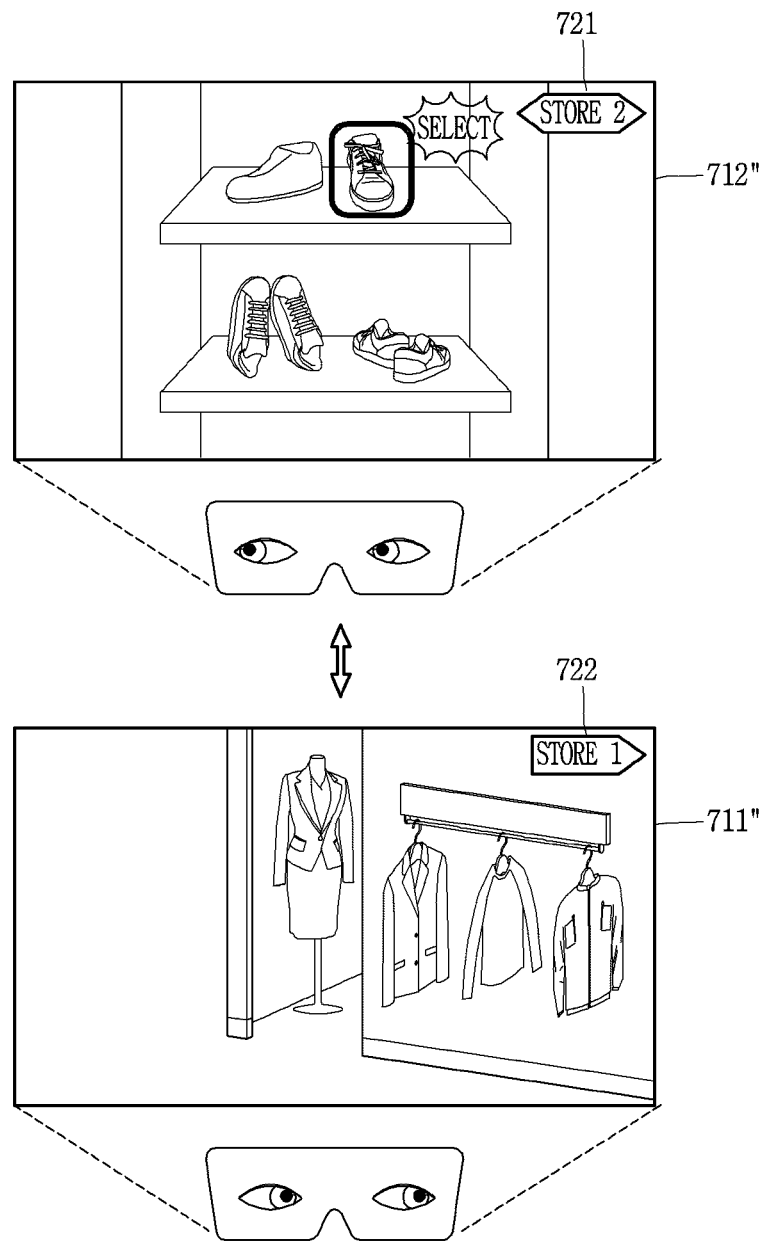

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Reference is now made to FIGS. 1 and 2, where FIG. 1 is a block diagram of a mobile terminal in accordance with the present disclosure, and FIG. 2 is a view illustrating a glass type terminal as an example of the mobile terminal according to the embodiment of the present disclosure.

Referring to FIG. 1, the mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170.

In some cases, a plurality of cameras 121a and 121b provided in the mobile terminal may be arranged in a matrix configuration to permit a plurality of images having various angles or focal points to be input to the mobile terminal 100. Also, the plurality of cameras 121a and 121b may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap)

touch, a long touch, a multi-touch, a drag touch, a flick touch, a pinch-in touch, a pinch-out touch, a swipe touch, a hovering touch, and the like.

The IR sensor 143 is a sensor for sensing information of infrared light, possessed by an object. In this specification, an infrared LED having a wide directional angle may be used as an example of the IR sensor 143. The IR sensor 143 may be configured with a plurality of modules, and the plurality of modules may be disposed to be spaced apart at a predetermined interval about the camera 121.

The gyro sensor 144 is a sensor for sensing a position or movement of the terminal, may sense a direction rotated with respect to a reference direction and information. In the present disclosure, the movement of a user's head may be tracked through the gyro sensor 144, etc. on the assumption that the mobile terminal 100 is formed to be wearable on the user's head or coupled to a means formed in such a manner.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations n a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

In the present disclosure, an augmented reality (AR) screen may be displayed on a display unit 151. Specifically, the controller 180 may display, on the display unit 151, a graphic object displaying additional information on a subject together with an image of the subject. To this end, the controller 180 may include an AR generation unit (not shown) for generating an AR screen.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIG. 2, the glass-type mobile terminal 100 can be wearable on a head of a human body and provided with a frame 101 (case, housing, etc.) therefor. The frame may be made of a flexible material to be easily worn.

The frame 101 may be supported on the head and defines a space for mounting various components. As illustrated, electronic components, such as a control module 180, an audio output module 152, and the like, may be mounted to the frame 101. Also, a lens 203 for covering either or both of the left and right eyes may be detachably coupled to the frame 101.

The control module 180 controls various electronic components disposed in the mobile terminal 100. The control module 180 may be understood as a component corresponding to the aforementioned controller 180. FIG. 2 illustrates that the control module 180 is installed in the frame part on one side of the head, but other locations are possible.

The display unit 151 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 100, the display unit 151 may be located to correspond to either or both of the left and right eyes. FIG. 2 illustrates that the display unit 151 is located on a portion corresponding to the right eye to output an image viewable by the user's right eye.

The display unit 151 may project an image into the user's eye using a prism. Also, the prism may be formed from optically transparent material such that the user can view both the projected image and a general visual field (a range that the user views through the eyes) in front of the user.

In such a manner, the image output through the display unit 151 may be viewed while overlapping with the general visual field. The mobile terminal 100 may provide an augmented reality (AR) by overlaying a virtual image on a realistic image or background using the display.

The camera 121 may be located adjacent to either or both of the left and right eyes to capture an image. Since the camera 121 is located adjacent to the eye, the camera 121 can acquire a scene that the user is currently viewing. The camera 121 may be positioned at most any location of the mobile terminal. In some embodiments, multiple cameras 121 may be utilized. Such multiple cameras 121 may be used to acquire a stereoscopic image.

When the camera 121 is provided in plurality, the plurality of cameras may be provided inside and outside the glass type terminal 100, respectively. In this case, ambient environment or background may be captured using the camera provided outside the glass type terminal 100, and user's eyes may be tracked using provided inside the glass type terminal 100. Here, the user's eye-tracking refers to a technique of tracking the user's eyes by analyzing an image input through the camera provided inside the glass type terminal 100 and recognizing the user's pupils.

The glass-type mobile terminal 100 may include a user input unit 123, which can each be manipulated by the user to provide an input. The user input unit 123 may employ techniques which permit input via a tactile input. Typical tactile inputs include a touch, push, or the like. The user input unit 123 is shown operable in a pushing manner and a touching manner as they are located on the frame part and the control module 180, respectively.

If desired, mobile terminal 100 may include a microphone which processes input sound into electric audio data, and an audio output module (not shown) for outputting audio. The audio output module may be configured to produce audio in a general audio output manner or an osteoconductive manner. When the audio output module is implemented in the osteoconductive manner, the audio output module may be closely adhered to the head when the user wears the mobile terminal 100 and vibrate the user's skull to transfer sounds.

The glass type terminal 100 may generate infrared light by using one or more IR sensors (e.g., IR LEDs) 155*a*, 155*b*, and 155*c*. The IR sensors 155*a*, 155*b*, and 155*c* are disposed adjacent to the camera 121, and allow the generated infrared light to be transmitted the outside therethrough. In order to support the range of viewing angles of the camera 121, the IR sensors 155a, 155b, and 155c may be disposed at positions adjacent to the camera 121 in the form in which a plurality of infrared light emitting devices are condensed. The infrared light transmitted through the IR sensors 155a, 155b, and 155c may be scanned at an arbitrary position of an image output through the display unit 151. The IR sensors 155a, 155b, and 155c may change the position and direction of the infrared light transmitted to the outside, based on a predetermined input signal.

As shown in FIG. 2, one 155a of the IR sensors 155a, 155b, and 155c may be disposed adjacent to the camera 121 provided at the right side of the frame portion 101. The other IR sensors 155b and 155c may be further respectively provided at the center and right side of the frame portion 101 so as to support the range of viewing angles of the camera 121. When the plurality of IR sensors 155a, 155b, and 155c are provided as described above, the plurality of IR sensors 155a, 155b, and 155c may selectively emit light in response to a control signal transmitted from the controller 180.

Meanwhile, the infrared light emitted from each of the IR sensors 155a, 155b, and 155c may be marked in a predetermined form on a virtual image output on the display unit 151. Hereinafter, such a mark may be referred to as a "marker." The marker may have, for example, a form such as a point, an arrow, a cursor, a prompt, or an outline.

As described above, the mobile terminal 100, e.g., the glass type terminal according to the embodiment of the present disclosure stores information on an object in which a user is interested in an actual environment through the camera provided therein, and marks the stored information as AR information on a virtual reality (VR) screen by reflecting a current state of the object, so that the user can have a re-experience (relive, nacherleben) as if the user revisits an actual space that the user previously visited. Here, the re-experience (relive, nacherleben) refers to that the user feels as if the user re-experiences one that the user previously experienced.

To this end, the mobile terminal 100 may sequentially acquire a first image for AR by activating the camera provided in a main body thereof, and may receive an input for selecting a specific object among objects included in the acquired first image. If the input is received, the controller of the mobile terminal 100 may store, in the memory, information related to the selected specific object, for example, product information (e.g., shape, model name, color, price, size, quantity, etc.) or position information corresponding to the specific object.

Meanwhile, if a VR mode is executed based on a user input, the controller of the mobile terminal 100 may receive image information from an external server connected thereto or may form and output a VR screen based on the above-described first image. In this case, a space arrangement may be made on the formed VR screen, based on the information stored in the memory. For example, buildings, spaces, etc. may be arranged on the VR screen, based on a place that the user actually visited, a user's movement, a time for which the user stays at the same place, a position at which a specific object exists, a place that the user has recently visited, and the like.

The mobile terminal 100 may receive, in real time, update information on the selected specific object, i.e., a current state of the object through communication with an external server. Here, the external server includes all information related to a place that the user visits (e.g., information on a position of a building and a disposition of the building in an actual space, information on a recent shape of a product sold in the building, a change in disposition of the product, a stock status of the product, and the like), and corresponds to a database (DB) built to update recent information thereon. The update information received from the external server may be reflected in real time on the VR screen output through the mobile terminal, to be marked as AR information, etc.

As such, the mobile terminal 100 according to the embodiment of the present disclosure marks, through a VR screen, an image of an object or product in which the user was interested in an actual environment, the user can have a re-experience (relive, nacherleben) as if the user revisits a place at which the corresponding object or produce exists.

Meanwhile, in order to enable the user to have the re-experience (relive, nacherleben), the main body of the mobile terminal 100 according to the embodiment of the present disclosure may be formed to be wearable on the user's head or coupled to a means formed to be wearable on the user's head. Hereinafter, the present disclosure will be described on the assumption of this.

In addition, hereinafter, an 'AR mode' is used to mean a screen mode in which AR information is overlapped with a preview image of an actual environment, which the user views. Also, the 'VR mode' is used to mean a screen mode which does not show an actual environment but shows 2D or 3D based VR produced through equipment such as rendering equipment. As described in detail below, various AR information may be marked on the VR screen.

Hereinafter, a method of displaying, on a VR screen, an object in which a user is interested in an actual environment, through the mobile terminal 100 according to the embodiment of the present disclosure, will be described in detail with reference to FIGS. 3A to 3E. FIGS. 3A and 3B illustrate a case where the AR mode is executed. FIGS. 3C and 3E illustrate a case where the VR mode is executed.

First, referring to FIG. 3A, if the AR mode is executed, the camera provided outside the mobile terminal 100 is activated, so that a preview image of an actual environment is output through the display unit. That is, if the preview image for AR, i.e., a first image is sequentially acquired through the camera, the controller 180 marks the acquired first image on the display unit 151. Here, the AR mode, for example, may be executed as the user applies a predetermined touch input (e.g., a swipe input applied to a left frame of the main body) to the mobile terminal 100 and/or speaks a predetermined voice command.

Here, the sequentially acquired first image is an image continuously acquired after the camera is activated. The first image is distinguished from an image instantaneously captured according to a general capturing command. Therefore, the first image includes not only an image of the actual environment at a point of time when the user views but also a sound of the actual environment input through the microphone.

Meanwhile, if an input for staring at or selecting any one of at least one object included in the first image is received while the first image is sequentially acquired, the controller 180 of the mobile terminal 100 may mark information related to the selected object as an AR image on the first image.

To this end, the controller 180 may track movement of the user's head or pupils by using the camera (and the IR sensor) provided inside the mobile terminal 100 or the gyro sensor, to recognize an object in which the user is interested or recognize an input for selecting the object. The controller 180 may analyze image data transmitted from the camera provided inside the main body of the mobile terminal 100, etc., to determine which point the user views in an actual space.

For example, if the user stares at a specific object (e.g., a bag) 302 displayed on a window of a store as shown in FIG. 3A, the controller 180 may recognize the specific object 302 and mark, on the specific object 302, a marker 301 moving along the user's eyes. In this case, if a user input for selecting the specific object is received, an image object (e.g., a box image) 303 notifying the user that the specific object has been selected as shown in FIG. 3A or an AR image (e.g., an icon, a pop-up window, etc.) having the same shape as the selected specific object may be output around the selected specific object.

Here, the user input for selecting the specific object may be variously implemented. For example, when the user speaks a predetermined voice command (e.g., 'I love it'), performs a gesture of a predetermined pattern (e.g., an eye wink of a predetermined pattern), or applies a touch input to the mobile terminal in a state in which the user stares at the specific object, this may be recognized as the user input for selecting the specific object.

If a specific object is selected as described above, the controller 180 stores, in the memory 170, information related to the selected object, for example, product information (e.g., shape, model name, color, price, size, quantity, etc.) or position information corresponding to the selected specific object. In this case, the position information corresponding to the selected object may be detected using position information of the mobile terminal 100. If information related to the selected specific object is stored, the image object or AR image marked on the first image may be disappeared or switched to a simple alternate image.

Meanwhile, in the present disclosure, it will be apparent that various information related to an object included in the first image may be marked as an AR image in advance. However, it is implemented that additional information related to only an object in which the user is interested is marked as an AR image such that the user's eyes are not interrupted and such that the mark on the display unit is not complicated.

Continuously, if a predetermined input signal is received from the user while the first image is output on the display unit 151, the controller 180 may gather AR images corresponding to the object or product in which the user is interested, i.e., the selected specific object, and output the gathered AR images on the first image (entering into a comparison mode).

For example, if the user moves the user's head with a predetermined pattern (e.g., nodding a predetermined number of times) in a state in which the user applies a touch input to the main body of the mobile terminal 100, AR images 311, 312, 313, 314, and 315 of the selected object are simultaneously marked while being overlapped on a preview image showing a real space as shown in FIG. 3B. The AR images 311, 312, 313, 314, and 315 may have the same shape as the corresponding object, and may be marked to correspond to a selected order. Also, additional information (e.g., price information, quantity information, etc.) on the corresponding object may be further marked on the AR images 311, 312, 313, 314, and 315.

Meanwhile, when many objects are selected, the AR images 311, 312, 313, 314, and 315 may be divided and marked on a plurality of virtual pages. In this case, the user may move the user's eyes in the left/right direction or moves the user's head, thereby comparing the AR images 311, 312, 313, 314, and 315 of previous/next pages with each other.

As any one of the AR images 311, 312, 313, 314, and 315 is selected, the controller 180 may control additional information to be marked on a current image or may control the selection to be cancelled.

Meanwhile, if the user shakes the user's head to the left and right in a state in which the user applies a touch input to the main body of the mobile terminal 100, the execution of the above-described comparison mode or AR mode is terminated. As another example, if any input signal is not sensed for a predetermined time, the execution of the AR mode may be stopped (or terminated), and the state of the camera may be switched to a non-activation state.

If the user applies a predetermined touch input (e.g., a swipe input applied to the left frame of the main body) to the mobile terminal 100 and/or speaks a predetermined voice command in a state in which the mobile terminal 100 is worn on the user's head or coupled or connected to a means formed in such a manner, the 'AR mode' may be executed.

In this case, an image corresponding to the VR mode may be implemented as a 2D or 3D image. Also, the image corresponding to the VR mode may be generated based on a virtual image received from the external service connected to the mobile terminal or generated based on the first image sequentially acquired in the AR mode, to be output through the display unit.

To this end, the mobile terminal 100 may be connected to an external server for AR through the wireless communication unit 110, a web application, etc. Here, the external server may store various information related to various objects (e.g., buildings, stores, milestones, products, etc.) included in an actual environment. The information related to the objects may include at least one of shapes of the objects, POI information related to the objects (e.g., lot numbers, addresses, names, etc. of buildings or stores), related link information (e.g., homepage addresses, etc. of stores), related image information (e.g., image logos, etc. of buildings or stores), and related audio information (e.g., logo songs of buildings or stores). The external server may update change information on various objects included in an actual environment (e.g., changes related to buildings, stores, milestones, products, etc.) and store the updated change information. The mobile terminal 100 may be connected to the external server, to acquire, periodically or in real time, information (including update information) related to a place visited by the user or an object selected by the user. In this case, position information of the place visited by the user or the object selected by the user may be acquired by transmitting position information of the mobile terminal 100 to the external server.

In the present disclosure, a second image corresponding to the VR mode is configured based on a place visited by the user or a specific object selected through a user input, on the basis of the first image sequentially acquired in the above-described AR mode.

Referring to FIG. 3C, if a screen 320 corresponding to the VR mode is output through the display unit of the mobile terminal 100 worn by the user, the corresponding screen 320 may be configured such that images (e.g., 'LG OUTLET') 321 and 322 representing a place most recently visited by the user are more visually attractive. For example, an image representing a place recently visited by the user may be expressed lager than other images, or a highlighting effect (e.g., flickering, expression as another image or color, etc.) may be applied to the image representing a place recently visited by the user, thereby inducing the user to enter the place. To this end, the controller 180 may be connected to the above-described external server, to receive update information related to a specific object selected in the AR mode and control a mark change corresponding to the received update information to be displayed on the corresponding screen 320. As an example, when the name of a building at a place (e.g., 'LG OUTLET') recently visited by the user is changed, the changed name of the building may be marked on the pop-up image 321.

Meanwhile, if the VR mode is executed as described above, the controller 180 may activate the camera 121b provided inside the main body of the mobile terminal 100, thereby tacking movement of the user's pupils. Alternatively, the controller 180 may simultaneously activate the plurality of cameras 121a and 121b provided outside and inside the main body of the mobile terminal 100, thereby simultaneously movement of the user's pupils and a gesture input based on images acquired from the plurality of cameras 121a and 121b.

For example, in FIG. 3C, if the user winks the user's eyes a predetermined number of times (e.g., closing and then opening of the user's eyes for 1 second or more, winking twice or more, etc.) in a state in which the user's eyes are fixed to the image 322 or text 321 representing the place recently visited by the user for a reference time, the controller 180 may recognize the wink as a control command for entering a virtual space (e.g., 'LG OUTLET') corresponding to the corresponding image 322 or text 321. Accordingly, the current screen 320 is switched to an image corresponding to the entered virtual space.

In this case, the entered virtual space may be located identically to an actual environment or may be relocated based on a place visited by the user or an object selected by the user. If the user enters a new virtual space as described above, the controller 180 may control noise, music, voice, etc., heard by the user in an actual space corresponding to the virtual space, to be output through the sound output unit 152, so that the user feels as if the user revisits the actual space.

If a predetermined input signal is received while an image corresponding to the VR mode is output, the controller 180 may call information related to objects selected in the AR mode, thereby providing the called information as an AR image overlapped on a current image. As an example, when the user wearing the mobile terminal 100 performs a predetermined gesture input, e.g., a gesture input of nodding a predetermined number of times, information related to a specific object previously stored in the memory 170 may be popped up as AR images on a current image. That is, while the VR mode is executed, the user may gather information on objects which the user was previously interested and identify the gathered information as AR images. In this case, when many AR images are to be popped up, the AR images may be divided and marked on a plurality of virtual pages as described above. In this case, the user may move the user's eyes in the left/right direction or moves the user's head, thereby identifying the AR images of previous/next pages.

Referring to FIG. 3D, it can be seen that AR images 331, 332, 333, 334, and 335 similar to those of FIG. 3B are displayed on an image 323 in a virtual space which the user enters. In this case, the displayed AR images 331, 332, 333, 334, and 335 are marked together with up-to-date information received from an external server connected to the mobile terminal 100. That is, in FIG. 3D, a first icon 343 notifying that product 3 is out of stock and a second icon 344 notifying that product 4 is near out of stock are popped up at positions adjacent to corresponding product images 333 and 334, respectively.

In this case, when the user intends to enter a store at which the product 4 which is near out of stock is located, if the user performs a predetermined gesture input for space entrance (e.g., winking for a predetermined time or winking a predetermined number of times) in a state in which the user's eyes are fixed to the AR image 334 corresponding to the product 4 or the second icon 344, the user may enter a space of the store at which the product corresponding to the AR image 334 or the second icon 344 is located.

As another example, the user may select any one of the displayed AR images 331, 332, 333, 334, and 335 by moving a virtual hand image corresponding to a user's hand gesture, using the camera provided outside the main body of the mobile terminal 100, to enter a corresponding virtual space. In this case, 180 may a feedback signal notifying entrance into a new virtual space to be output.

Accordingly, as shown in FIG. 3E, the screen is switched to a virtual space image 324 on which the product 4 is located, and an image 334" of the product 4 having the same shape as the actual product is marked at an actually corresponding position on the virtual space 324. In addition, the AR image 344 notifying that the product 4 is near out of stock as up-to-date information on the product 4 is marked adjacent to the image 334" of the product 4. Meanwhile, although not shown in this figure, when the up-to-date information on the product 4 is changed, e.g., when the product 4 is out of stock, the information (e.g., 'near out of stock') marked on the AR image 344 may be switched to text information notifying that the product 4 is out of stock.

As described above, the mobile terminal 100 according to the embodiment of the present disclosure forms a VR screen based on an object or product in which the user was interested in an actual environment, and marks, as an AR image, up-to-date information related to the object or product which the user was interested on the VR screen, thereby providing convenience to the user.

Hereinafter, a method of displaying an object selected in an AR mode on a VR screen, using the mobile terminal 100 according to the embodiment of the present disclosure, will be described in detail with reference to FIG. 4.

First, if a first input signal is sensed, the mobile terminal 100 according to the embodiment of the present disclosure may enter into an AR mode (S110). Here, the first input signal is generated through a predetermined input for entering into the AR mode. For example, the first input signal may be triggered by a touch input applied to a specific frame (e.g., a frame corresponding to the user's right eye) of the main body of the mobile terminal 100, an input (e.g., 'Wow,' 'I love it,' etc.) of a predetermined voice command, a predetermined gesture input, or the like.

If the mobile terminal 100 enters into the AR mode as described above, the controller 180 of the mobile terminal 100 may sequentially acquire a first image for AR, using the first camera 121a provided outside the main body of the mobile terminal 100 (S120). Here, the first image is a preview image continuously acquired as described above, and includes sounds such as noise, voice and music, which are heard in a corresponding space.

Next, if an input for selecting a specific object among at least one object included in the acquired first image is received (S130), the controller 180 stores information related to the selected specific object in the memory 170 (S140). The controller 180 may output information notifying that the specific object has been selected (e.g., a shadowing or highlighting effect near the specific object, a corresponding feedback voice, etc.). The controller 180 may extract information related to the selected specific object (e.g., shape, model name, product information, price, etc.) from the external server or the mobile terminal 100 and then overlap the extracted information as an AR image on the first image. In this case, the output AR image may be disappeared after a predetermined time such that the display unit is not complicated.

Meanwhile, if a second input signal is sensed, the mobile terminal 100 may enter into a VR mode corresponding to the sequentially acquired first image (S150). Here, the second input signal is generated through a predetermined input for entering the VR mode. For example, the second input signal may be triggered by a touch input applied to a specific frame (e.g., a frame corresponding to the user's left eye) of the main body of the mobile terminal 100, an input of a predetermined voice command (e.g., 'My town!,' etc.), a predetermined gesture input, or the like.

If the mobile terminal 100 enters into the VR mode, the controller 180 of the mobile terminal 100 drives the second camera 121b provided inside of the main body of the mobile terminal 100 and/or the IR sensor 143 provided adjacent to the second camera 121b, to tack the user's eyes on a VR screen.

If the VR mode is executed, the controller 180 may reconstruct a second image, i.e., a VR screen, based on information related to the specific object stored in the memory 170, and output the reconstructed second image (S160). Here, that the VR screen is re-constructed based on the stored specific object means that an image related to a specific object selected through a user input in an actual space is located to be more visually prominent in a VR space or that the VR screen is relocated based on the image.

Meanwhile, if the VR mode is executed, the controller 180 may be connected to an external server through the wireless communication unit 110, thereby receiving update information related to the selected specific object (S170). Then, the controller 180 may control a corresponding display change to be displayed on the displayed second image, i.e., a mark change corresponding to the VR screen, using the received update information (S180).

Here, the external server may mean a terminal or database (DB) which stores various information (e.g., shapes of the objects, POI information related to the objects, related link information, related image information, related audio information, etc.) included in an actual environment. If one of the information related to the various objects included in the actual environment is changed, the external server may update the corresponding information. The external server may be connected to the mobile terminal 100 in the AR mode to receive, from the mobile terminal 100, information on a specific object selected through a user input or information on user's movement, and transmit additional information related to the selected specific object to the mobile terminal 100.

The received update information is up-to-date information related to a current state of the selected specific object, and includes, for example, not only basic changes related to a shape and a position of the selected specific object but also special changes related to purchase options such as a quantity of and a price of the selected specific object.

If a change is included in the received update information, the controller 180 may mark the received update information as a pop-up AR image on the current image. In this case, a feedback signal or highlighting effect (e.g., an effect in which the AR image is flickered) notifying that the update information has been received may be output together with the pop-up image. The controller 180 may set a notification of the update information (e.g., a pop-up AR image) and a notification interval or change the set notification and the notification interval, based on a user's input.

If a predetermined key input, voice command, or gesture input is applied while the VR mode is executed, the controller 180 may call a list on the selected specific object at any time.

If an input for calling the list on the selected specific object is sensed as described above, the controller 180 may control the list on the selected specific object to be popped up as an AR image on the currently displayed VR screen. Then, the user may determine a current state of the object through the pop-up AR image and then immediately enter a virtual space in which the specific object is located with only the user's eyes fixed to the pop-up AR image.

As described above, in the mobile terminal 100 according to the embodiment of the present disclosure, both the AR mode and the VR mode can be executed. Hereinafter, FIGS. 5A and 5B illustrate exemplary screens corresponding to the AR mode and the VR mode.

If a first input (e.g., a predetermined touch input, gesture input, voice input, etc. for entering into the AR mode) is received to the main body of the mobile terminal 100, the controller 180 of the mobile terminal 100 may drive the first camera 121a provided outside of the main body of the mobile terminal 100, and enter into the AR mode for sequentially acquiring a first image for AR through the driving of the first camera 121a.

Accordingly, as shown in FIG. 5A, a preview image corresponding to a real space is displayed through the display unit 151. In this case, the controller 180 may mark, in one area of the display unit 151, an AR image 510 on which text information (e.g., 'AR mode') notifying the current operation mode, i.e., the AR mode is marked.

Meanwhile, if a second input (e.g., a predetermined touch input, gesture input, voice input, etc. for entering into the VR mode) is received to the main body of the mobile terminal 100, the controller 180 of the mobile terminal 100 may further drive the second camera 121b provided inside the main body of the mobile terminal 100, and be connected to an external server through the wireless communication unit 110 to receive various information related to objects marked on the first image and update information related to a selected specific object stored in the memory 170. Then, the controller 180 may reconstruct a VR screen corresponding to the real space based on the selected specific object and output the reconstructed VR screen. In this case, the above-described AR mode is automatically terminated.

Accordingly, as shown in FIG. 5B, a virtual space image corresponding to the real space viewed in the AR mode is displayed. In this case, an AR image 520 on which text information (e.g., 'VR mode') notifying the current operation mode, i.e., the VR mode is marked may be popped up in one area of the displayed virtual space image.

The controller 180 may output selection marks 521a and 522a (e.g., box-shaped image objects) visually distinguished from the selected specific object in the AR mode among objects marked on the displayed virtual space image. If update information on the selected specific object exists based on a current state, the controller 180 allows notification icons 521b and 522b notifying the update information to be popped up as AR images, so that the user can detect a current state of an object without revisiting the real space.

Meanwhile, in the above-described AR mode, the user may select a specific object in which the user is interested on a preview image corresponding to the real space. The controller 180 may generate an AR image (e.g., a pop-up text image or icon) corresponding to the selected specific object, and mark the generated AR image while being overlapped on the preview image. Here, various information related to the selected object (e.g., position information of the selected object, price information, items input by the user in the selection of the object, etc.) may be marked on the AR image.

The method of selecting the specific object on the preview image may be generally divided into a location-based manner and a marker-based manner.

Specifically, the location-based manner is a method in which the mobile terminal 100 acquires an image of an object viewed from a current position through the camera provided outside the main body thereof, using GPS information of the mobile terminal 100 and information (direction and slope information) of a gyro sensor, a terrestrial magnetic sensor, etc., thereby recognizing that a specific object has been selected. The marker-based manner is a method in which the mobile terminal 100 recognizes position information of an object on which a marker is marked by marking a marker moving along the user's eyes on a preview image, using the camera provided inside the main body thereof, and then detects a size of the marker, a distance between the marker and the mobile terminal 100, and the like, thereby recognizing that a specific object has been selected. If a specific object is selected in any manner, information related to the selected specific object may be stored in the memory 170 and transmitted to an external server, thereby receiving update information on the selected specific object from the external server.

Hereinafter, a method of selecting a specific object through the marker-based manner and marking the selected specific object on an AR screen in the AR mode will be described in detail with reference to FIG. 6.

To this end, in the present disclosure, a tracking unit 181 capable of tacking the user's head or eyes may be provided in the controller 180 or separately from the controller 180. The tracking unit 181 may track movement of the user's head or eyes, based on image information acquired through the second camera 121b provided inside the main body of the mobile terminal 100 and direction information acquired through the gyro sensor 144.

If the AR mode is executed as a first input (e.g., a predetermined touch input, voice input, gesture input, etc. for entering into the AR mode) is received to the main body of the mobile terminal 100, the controller 180 may output a preview image corresponding to a real space on the display unit 151, and activate the second camera 121b and the gyro sensor 144 to track movement of the user's head or eyes.

Accordingly, as shown in FIG. 6, a marker is marked on an object (e.g., a 'T shirt') to which the user's eyes are fixed on the preview image, and an image object (e.g., a box image) 611 notifying that the selection of the object is possible is marked around the object on which the marker is marked.

If a third input (e.g., a predetermined voice command, a predetermined touch input, a predetermined gesture input (e.g., winking at a predetermined interval or winking a predetermined number of times), etc.) for selecting a corresponding object is received in the state in which the image object 611 is marked as described above, the controller 180 may select the corresponding object, and output an AR image 612 corresponding to the selected object through the display unit. A direction (e.g., a 'speech bubble') in which the selected object is located and a product name (e.g., 'product 1') of the selected object may be marked on the AR image 612.

The controller 180 may store, in the memory 170, information related to the selected object, e.g., at least one of a position at which the selected object is located, a user's visiting time, and corresponding product information (e.g., quantity information, color information, information related to purchase, etc.). The controller 180 may mark number information (e.g., 'selected product 1') 613 of the object selected through the user input in one area of the preview image.

Meanwhile, if a reference time elapses, the controller 180 may control the AR image 612 to be disappeared, and induce the user to select another object by marking a new marker in one area of the current preview image.

Although not shown in this figure, when the selected object is a moving object or an object of which continuous tracking is required, a first marker moving along the user's head or eyes and a second marker moving along the selected object may be simultaneously marked. In this case, the controller 180 may control the AR image corresponding to the selected object not to be disappeared and but to move along the moving object.

Hereinafter, an example of a method of controlling a VR screen configured based on a user's actual visiting history will be described in detail with reference to FIGS. 7A and 7B.

In an embodiment of the present disclosure, if the VR mode is executed, the controller 180 may dispose image objects marked on a VR screen, based on at least one of position information of a specific object selected in the AR mode and user's movement information. That is, the controller 180 may dispose the image objects as distorted images such that a selected specific object or a place actually visited by the user is more visually prominent on the VR screen.

As a result, for example, as shown in FIG. 7A, images 711, 712, and 713 corresponding to a plurality of spaces which the user actually visited are displayed in a plurality of areas, respectively. In this case, the order or direction where the images are displayed is marked to correspond to the order or direction where the user visited, instead of actual spaces. Spaces which the user did not visit among the actual spaces may not be configured as images.

Meanwhile, in FIG. 7A, on the image 712 of a virtual space in which an object selected while the user actually visited the actual space exists, indicators (e.g., a box image and a pop-up sticker indicated as 'SELECTED') 721a and 721b indicating the selected object (e.g., 'shoes') may be marked around an image corresponding to the selected object. The controller 180 may control the user to enter a virtual space corresponding to the image corresponding to the selected object by allowing the user's eyes to be fixed to the displayed images 711, 712, and 713 or using a marker.

To this end, if the VR mode is executed, the controller 180 may automatically activate the camera 121b provided inside the main body of the mobile terminal 100 so as to tack movement of the user's pupils.

For example, in FIG. 7A, if an input (e.g., a predetermined touch input, a predetermined voice command, or a predetermined gesture input (e.g., winking at a predetermined interval or winking a predetermined number of times)) for entering a new space is received in a state in which the user's eyes are fixed to the image corresponding to the selected object (e.g., 'shoes'), the controller 180 may control the user to enter a virtual space (e.g., a 'shoe store') in which an actually selected object is located. In this case, the controller 180 may output a feedback signal (e.g., a guidance voice, etc.) for notifying that the user has entered the new virtual space. Although not shown in this figure, when the user enters the new virtual space, the controller 180 may control an animation effect such as a distorted image to be output on the currently displayed VR image.

FIG. 7B illustrates a result that the user enters a virtual space (e.g., a 'shoe store') based on an image corresponding to the selected object as described above. Meanwhile, if the user enters a virtual space corresponding to the selected object, the controller 180 may mark indicator information (e.g., 'STORE 2') 712 indicating the position of a virtual space which the user enters on a current image among the displayed images 711, 712, and 713. Direction information on previous/next spaces which the user can enter may be marked on the indicator information 721. As an example, arrow marks in the left and right direction, which are marked on the indicator information 721, intuitively indicate that there exists a space which the user previously visited and a space which the user visited next, based on the current position ('STORE 2').

Meanwhile, the user may take a predetermined gesture (e.g., winking at a predetermined interval or winking a predetermined number of times) in the entered virtual space and then move the user's head or eyes in the left/right direction, to immediately move to a virtual space corresponding to the spaces which the user visited previously/next.

That is, in FIG. 7B, if the user winks the user's eyes for 1 second or more and then tilts the user's head or moves the user's eyes to the left, the controller 180 may control the user to immediately enter a virtual space corresponding to the space (e.g., 'STORE 1') which the user previously visited from the current location. As a result, a VR screen 711" corresponding to STORE 1 may be output through the display unit, and indicator information (e.g., 'STORE 1') indicating the location of the newly entered virtual space is marked in one area of the corresponding screen 711". Although not shown in this figure, if the user enters a new virtual space as described above, a sound corresponding to the newly entered virtual space is output through the sound output unit 152.

In this state, if the user again winks the user's eyes for 1 second or more and then tilts the user's head or moves the user's eyes to the right, the controller 180 may control the user to again move to the space (e.g., 'STORE 2') which the user visited next from the current location.

If an input (e.g., a gesture of closing the user's eyes and tilting the user's head in the left/right directions a predetermined number of times) for entering the new virtual space and then getting out of the entered virtual space is sensed, the controller 180 may control the current image to be switched to the VR screen which was previously displayed, instead of the space which the user visited previously/next.

Hereinafter, an example of a method of controlling a VR screen based on a user's virtual visiting history in the VR mode will be described in detail with reference to FIGS. 8A to 8C.

First, referring to FIG. 8A, if the VR mode is executed, the controller 180 of the mobile terminal 100 may mark a visually distinguished indicator around an image object where the user can enter a new space on a VR screen. For example, in FIG. 8A, if there exists a virtual space which the user can further enter exist in a building disposed on a VR screen 801, predetermined indicators (e.g., images marked by '!') 811a, 811b, and 811c are marked at locations where the user can enter.

As such, if a predetermined movement of the user's pupils is sensed in a state in which the user's head or eyes are fixed to any one among the image objects marked by the indicators, the controller 180 may output, on a second image, a mark change for notifying that the user has entered a virtual space corresponding to the one image object to which the user's head or eyes are fixed. As an example, although not shown in this figure, the controller 180 may output a distorted image effect such as a hole of which size gradually extends around the image object 811a to which the user's head or eyes are fixed.

In this case, an image 902 of the entered virtual space corresponds to a space which the user actually visited. If the user enters a new virtual space as described above, the controller 180 may control a thumbnail image 812 showing a virtual space which the user previously visited to be popped up on the current image 802, for example, at a right upper end, so that the user can recognize from which location the user has entered the current virtual space.

Here, the displayed thumbnail image 812 may be overlapped with the image 802 of the current virtual space by adjusting the transparency thereof, may be marked in a picture in picture (PIP) or division screen form, or may be marked in a morphing/dissolving form.

Meanwhile, the controller 180 provides a 360 degree panoramic view of the displayed image 802 of the virtual space. Thus, although the user moves the user's head or eyes in the left/right or top/bottom direction while the displayed image of the virtual space is output, an image where only the user's observation point is moved to the left/right or top/bottom is displayed in the same virtual space. However, as described above, if the user performs a predetermined gesture (e.g., winking for 1 second or more) and then tilts the user's head or moves the user's eyes in one direction, the controller 180 may control the image 802 of the current virtual space to be immediately jumped to a virtual space which the user visited previously/next in the VR mode.

If the user's eyes in the pop-up thumbnail image 812 are fixed for a predetermined time or more (e.g., 1 second or more) and if the user's eyes in a thumbnail image 813 of which size is extended are moved to the left/right/top/bottom, the controller 180 provides a 360 degree panoramic view of the corresponding thumbnail image 812. In this case, an indicator mark (e.g., an arrow image) 814 indicating a direction in which the user's eyes are moved may be marked on the thumbnail image 813 with the extended size. Although not shown in this figure, if the user's eyes are moved as described above, a sound (e.g., noise, voice, music, etc.) corresponding to the currently displayed virtual space is changed into a sound corresponding to the space moved along the user's eyes.

Meanwhile, if the user's eyes are out of the thumbnail image 813, the thumbnail image 812 with the reduced size is again displayed. On the other hand, if a predetermined gesture input (e.g., winking for 1 second or more or winking twice or more) is sensed in a state in which the user's eyes are fixed to the thumbnail image 813, the controller 180 controls the current screen to get out of the current virtual space 802 and move to a space corresponding to the thumbnail image 813, i.e., the VR screen 801 which the user previously visited.

Continuously, FIG. 8B illustrates that a plurality of thumbnail images 831 and 832 corresponding to a history where the user has visited through virtual experience in the VR mode are simultaneously popped up in one area of a current image 821. The plurality of thumbnail images 831 and 832 may be displayed to be overlapped with each other in such a manner that the thumbnail image 831 corresponding to a virtual space B which the user has most recently visited is disposed at the top position.

In this case, if the user's eyes are fixed to the area in which the plurality of thumbnail images 831 and 832 are output for a predetermined time and then moves the user's eyes to the left/right, the image disposed at the top position of the plurality of thumbnail images is switched to the thumbnail image 832 corresponding to a virtual space C that the user visited prior to the space B. That is, as the user's eyes are moved to the left/right in the plurality of thumbnail images 831 and 832, the user may identify a visiting history of the virtual space as an image.

Meanwhile, if a predetermined gesture (e.g., a predetermined touch input, a predetermined voice command, or a predetermined gesture input (e.g., winking at a predetermined interval or winking a predetermined number of times)) is sensed in a state in which the user's eyes are fixed to the plurality of overlapped thumbnail images 831 and 832 for a predetermined time (e.g., 1 second or more), the controller 180 may control the user to enter a virtual space corresponding to an image 833 disposed at the top position of the plurality of overlapped thumbnail images 831 and 832, and control the image 821" of a space A which the user previously visited to be disposed at the top position of the plurality of thumbnail images.

As another example, the controller 180 of the mobile terminal 100 may control a VR screen, using a virtual hand image corresponding to a hand gesture, together with the user's head or eyes. To this end, if the VR mode is executed, the controller 180 may sense a user's hand gesture, based on an image acquired through the camera 121a provided outside the main body of the mobile terminal 100. The controller 180 may mark, in a 2D or 3D form, a virtual hand image corresponding to the sensed hand gesture on the VR screen.

Next, if any one of image objects marked on the VR screen is pointed using the virtual hand image moving along the sensed hand gesture, the controller 180 may provide a preview image of a virtual space corresponding to the pointed image object.

For example, referring to FIG. 8C, if the user points a desired location 805 on a displayed image 841a of a virtual space, using a virtual hand image 851, a preview image (e.g., a slashed box image) 852 corresponding to the pointed location 805 is marked. If a predetermined gesture input (e.g., a predetermined touch input, a predetermined voice input, a gesture input (e.g., winking for 1 second or more or winking twice or more), etc. for entering a new space) is sensed in the state in which the preview screen 852 is marked, the controller 180 may control the user to immediately enter a space corresponding to the preview screen 852.

As a result, as shown in FIG. 8C, a virtual space 841b corresponding to the preview image is displayed. As such, when a user's hand gesture is used, it is possible to more accurately point a location to which the user intends to move.

In the above, the methods for reconstructing a VR screen by reflecting a current state of an object selected in the AR mode have been described. As such, if a current state of an object in which the user was interested in the past is marked on a VR screen, the user can identify the object as if the user revisits an actual space and then perform purchase and the like.

Meanwhile, an embodiment of the present invention will be described below based on a process related to the purchase of a product corresponding to a selected object. However, present disclosure is not limited thereto, and may also be applied to processes related to comparison of products, exchange of products, contract of products, identification of up-to-date information, etc.

FIG. 9 illustrates an example of a method of performing a process related to the is a view illustrating a method of selecting optional information related to the purchase of a selected object, using the mobile terminal 100 according to the embodiment of the present disclosure.

If the VR mode is executed, the controller 180 may activate the second camera 121b provided inside the main body of the mobile terminal 100 so as to track movement of the user's head or eyes, and display AR images corresponding to a specific object selected in the above-described AR mode to be overlapped on a VR screen.

If a predetermined movement of the user's pupils (e.g., winking for 1 second or more or winking twice or more) is sensed in a state in which the user's head or eyes are fixed to any one of the AR images corresponding to the selected object marked on the VR screen, the controller 180 may control a specific object corresponding to the corresponding AR image to immediately move to a virtual space in which the specific object is located, and/or may control a process related to the purchase of the specific object to be executed.

If the process related to the purchase is initiated, the controller 180 may output a voice prompt for notifying the initiation of the process. During the execution of the process related to the purchase, the mobile terminal 100 may receive, in real time, up-to-date information related to the specific object from an external server connected thereto.

Accordingly, the controller 180 can display, around the AR image, option information related to the purchase among update information related to the specific object.

For example, as shown in FIG. 9, as various option information related to the purchase of a selected specific object (e.g., a 'TV'), size information (e.g., 'Inch') 911, color information ('Color') 912, price information ('Price') 913, card information 914 where benefits such as discount are applied, etc. of the object are popped up in the form of AR images, e.g., speech bubble images around the object. The selection of the displayed option information or the releasing of the selection of the displayed option information may be performed using a virtual hand image 921 moving along movement of the user's pupils through the second camera 121b or a user's hand gesture. For example, if the user's eyes are fixed to the AR image showing the size information 911 of the object and then performs a predetermined gesture, the size option of the object may be changed, and the current image of the object may be changed to correspond to the change of the size option.

Meanwhile, user authentication is to be performed so as to perform an actual payment as the option information, etc. are selected. In the present disclosure, the user authentication may be performed using only the second camera 121b provided inside the main body of the mobile terminal 100 and the IR sensor 143.

Specifically, while a purchase process is executed, the controller 180 may perform the user authentication by naturally scanning a user's iris and/or recognizing at least one of a user's eyeball radius, a distance between the pupils, and a kappa angle (or lambda angle), using the second camera 121b provided inside the main body of the mobile terminal 100 and the IR sensor 143. To this end, information on an iris of a registered user, information on an eyeball radius of the user, information on a distance between the pupils of the user, and information on a kappa angle (or lambda angle) may be previously stored in the memory 170 of the mobile terminal.

The iris scan refers to an authentication method of digitizing an iris pattern of an eyeball, which is unique for every person. The eyeball radius refers to a distance from a pupil or iris to the center point of an eyeball. Since eyeball radii are different from every person, the eyeball radius may be used as one of authentication manners.

The distance between pupils refers to a difference in distance between both the pupils corresponding to the left and right eyes. Since an actual pupil cannot be directly viewed, a distance between images passing through optical portions (e.g., corneas) located in front of the pupils, i.e., images of the pupils, observed from the outside, corresponds to the distance between the pupils.

Here, the kappa angle (or lambda angle) refers to an angle made by a pupil axis and a viewing axis. A difference in angle between a point which a user actually views and a point indicated by the pupil correspond to the kappa angle (or lambda angle). Meanwhile, when the viewing axis (cornea reflection point) is located toward the nose as compared with the pupil axis (pupil center point), the kappa angle is referred to as a positive kappa angle. When the pupil axis (pupil center point) is located toward the nose as compared with the viewing axis (cornea reflection point), the kappa angle is referred as a negative kappa angle.

In the present invention, the user's iris scan, the eyeball radius, the distance between the user's pupils, and the kappa angle for user authentication can be acquired using only the camera provided inside the main body of the mobile terminal 100 and the IR sensor configured to track movement of the user's pupils, and thus it is unnecessary to use any additional component. Further, the user authentication can be naturally performed while the purchase process is executed, thereby providing convenience to the user.

Meanwhile, if an input (e.g., a gesture input of closing the user's eyes and tilting the user's head to the left/right a predetermined number of times) for terminating the current process is sensed while the process related to the purchase is executed, the controller 180 may control the purchase to be cancelled and control the displayed option information to be disappeared.

Hereinafter, FIGS. 10A and 10B illustrate a method of, when an event related to a current state of a selected object occurs, marking the event on a VR screen.

In the present invention, if update information related to a specific object marked on a VR screen is received from an external server (e.g., a database storing various information related to a selected object) connected to the mobile terminal 100, the controller 180 of the mobile terminal 100 may control information marked on a current AR image to be changed corresponding to the received update information, or may control a new AR image to be popped up.

To this end, the controller 180 may periodically request the external server to transmit the update information or may inquire whether the update information is updated. If update information is received from the external server connected to the mobile terminal 100, the controller 180 may output a feedback signal (e.g., a sound, a notification icon, etc.) or output an AR image corresponding to the update information immediately on the currently displayed virtual image such that the user can identify the update information.

The controller 180 may control a marking time or interval of the corresponding AR image to be changed depending on an importance degree of the received update information or user's setting (in this case, a fade-out effect or a bubble explosion effect may be output as the AR image disappears). Alternatively, when necessary, the controller 180 may control the AR image not to be disappeared. For example, when the update information of a specific object (e.g., a 'TV') 1011 is 'OUT OF STOCK' as shown in FIG. 10A, the controller 180 may control a pop-up AR image 1012 showing 'OUT OF STOCK' not to be disappeared around the corresponding specific object 1011.

Meanwhile, if an event related to another selected object occurs while the user enters a virtual space in which the specific object has already been located or while a process related to purchase corresponding to the specific object is executed, the controller 180 may display a virtual icon for notifying the occurrence of the event to be overlapped on the current image.

For example, if event information for notifying that another selected object, e.g., a second product (e.g., a 'T shirt') is near out of stock is received while the user identifies a first product (e.g., a 'TV') through a specific virtual space, an AR icon 1013 related to the received event information is popped up on a currently displayed virtual space image 1001. The shape of an object in which the event occurs and contents of the event are marked on the pop-up AR icon 1013. Meanwhile, the marking of the received event information and the marking interval of the received event information, etc. may be set or changed through a user input.

Continuously, if a predetermined movement of the user's pupils (e.g., winking for 1 second or more or winking twice or more) is sensed in a state in which the user's head or eyes are fixed to a virtual icon for notifying the occurrence of an event, the controller 180 may control a current image to immediately move to a virtual space in which a specific object corresponding to the displayed virtual icon is located.

As a result, as shown in FIG. 10B, the current image may be switched to an image 1002 of the virtual space in which the second product is located, and a notification icon 1014 for executing a process related to purchase may be marked in the form of an AR image on the corresponding image 1002. Various option information (e.g., size, color and price) related to the purchase of a product may be displayed on the marked notification icon 1014.

Meanwhile, FIG. 11 is a view illustrating a method of marking an AR message related to purchase in a virtual space in which any selected object is not located in the mobile terminal according to the embodiment of the present disclosure.

When the user enters a virtual space in which any selected object is not located in the VR mode, the controller 180 of the mobile terminal 100 may output an AR image of a purchasable object, based on a user's usual pattern or a preference of many and un-specified persons. As an example, as shown in FIG. 11, AR images 1111, 1112, and 1113 on which price information are marked around purchasable objects may be popped up.

Although not shown in this figure, the controller 180 may further acquire additional information (e.g., link information, etc.) on a selected object by being connected to or interlocked with another VR server while the VR mode is executed.

The controller 180 may rotate a virtual image corresponding to a specific space or selected object, using a virtual hand image, and accordingly, the user can observe the specific space or the shape of a selected object in various viewpoints.

As described above, in the mobile terminal and a controlling method thereof according to the present disclosure, an image of an object or product in which a user was interested in an actual environment is marked through a VR screen, so that the user can have a re-experience (relive, nacherleben) nacherleben) as if the user revisits a place where the corresponding object or product is located. Also, a current state of an object or product in which the user was interested is reflected in real time and marked on a VR screen, so that it is possible to provide convenience to the user in performing a next operation, e.g., purchase of the product, learning related to the object, etc. Further, the entrance of the user into a new virtual space, the purchase of an object or product, the selection of option information, etc. are made by tracking the user's head or eyes on a VR screen, so that it is possible to provide convenience to the user in a more intuitive input manner.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a camera configured to sequentially acquire a first image for augmented reality (AR), which include at least one object;
a display unit configured to output the first image; and
a controller configured to, if an input for selecting a specific object among the at least one object included in the first image is received, store information related to the selected specific object,
wherein, if a virtual reality (VR) mode corresponding to the first image is executed, the controller forms and outputs a second image corresponding to the VR mode, based on the stored information, and, if update information related to the selected specific object is received from an external server, the controller controls a mark change corresponding to the received update information to be marked on the second image, and
wherein, if a first input is received, the controller executes an AR mode for sequentially acquiring the first image by activating a camera provided outside a main body of the mobile terminal, and, if a second input is received, the controller terminates the AR mode and executes the VR mode corresponding to the first image.

2. The mobile terminal of claim 1, further comprising a tracking unit configured to track a user's head or user's eyes based on image information acquired through a camera provided inside a main body of the mobile terminal and direction information acquired through a gyro sensor provided in the mobile terminal,
wherein the controller displays a corresponding image object by detecting a specific object to which the user's head or eyes are fixed in the first image through the tracking unit, and, if a third input is received in the state in which the image object is displayed, the controller selects the detected specific object.

3. The mobile terminal of claim 2, wherein, if the detected specific object is selected as the third input is received, the controller controls a mark change corresponding to the selection to be marked on the first image.

4. The mobile terminal of claim 3, wherein the main body of the mobile terminal is formed to be wearable on the user's head or coupled to a wearable mechanism formed to be wearable on the user's head, and
wherein, if a predetermined voice command or wink is sensed in a state in which an input is applied to an input unit provided in the main body of the mobile terminal or the wearable mechanism, the controller recognizes that the third input for selecting the specific object has been received.

5. The mobile terminal of claim 3, wherein, if the detected specific object is selected in plurality and if a fourth input is received, the controller executes a screen mode for comparing the plurality of selected specific objects, and gathers and outputs, on the first image, images corresponding to the plurality of selected specific objects.

6. The mobile terminal of claim 1, wherein the information related to the selected specific object includes at least one of a position at which the selected specific object is located, a user's visiting time, and corresponding product information.

7. The mobile terminal of claim 1, wherein, if the VR mode is executed, the controller arranges image objects marked on the second image, based on at least one of position information of the selected specific object and user's movement information in the first image.

8. The mobile terminal of claim 7, wherein, if the VR mode is executed, the controller activates a camera provided inside the main body of the mobile terminal to track movement of the user's pupils.

9. The mobile terminal of claim 8, wherein, if the VR mode is executed, the controller marks a visually distinguished indicator around an image object which is to enter a new space among the marked image objects.

10. The mobile terminal of claim 9, wherein, in the VR mode, if a predetermined movement of the user's pupils is sensed in a state in which the user's head or eyes are fixed to any one of the image objects, around which the indicator is marked, the controller controls a mark change for notifying that the user has entered a new virtual space to be marked on the second image.

11. The mobile terminal of claim 7, wherein, if the VR mode is executed, the controller senses a user's hand gesture by activating the camera provided outside the main body of the mobile terminal, and
wherein, if any one of the image objects marked on the second image is pointed using a virtual hand image moving along the sensed hand gesture, the controller provides a preview image of a virtual space corresponding to the pointed image object.

12. The mobile terminal of claim 1, wherein, if a predetermined input signal is received in the VR mode, the controller gathers virtual images corresponding to the selected specific object and marks the gathered virtual images on the second image, and
    wherein a notification icon for notifying, in real time, update information related to the selected specific object is marked together with the virtual images.

13. The mobile terminal of claim 12, wherein, in the VR mode, if the user's head or eyes are fixed to any one of the virtual images and if a predetermined movement of the user's pupils is sensed, the controller controls the user to enter a virtual space in which a specific object corresponding to the one virtual image is located, and executes a process for purchasing a product corresponding to the specific object.

14. The mobile terminal of claim 13, wherein, if the process for purchasing the product is executed, the controller performs user authentication, based on at least one of a user's iris scan, a user's eyeball radius, a distance between the user's pupils, and a kappa angle, using the camera provided inside the main body of the mobile terminal.

15. The mobile terminal of claim 13, wherein, if the process for purchasing the product is executed, the controller displays option information related to purchase among update information related to a specific object corresponding to the one virtual image, and controls the displayed option information to be selected based on movement of the user's pupils.

16. The mobile terminal of claim 12, wherein, in the VR mode, if the movement of the user's pupils faces a predetermined direction in a state in which the user enters a virtual space in which a specific object corresponding to the one virtual image is located, the controller controls the user to move, along the sensed direction, to a virtual space in which an object corresponding to another AR image is located.

17. The mobile terminal of claim 12, wherein, in the VR mode, when an event related to another virtual image occurs in a state in which the user enters a virtual space in which a specific object corresponding to the one virtual image is located, the controller controls a virtual icon for notifying that the event has occurred to be popped up.

18. The mobile terminal of claim 17, wherein, if the user's head or eyes are fixed to the virtual icon and if a predetermined movement of the user's pupils is sensed, the controller controls a current image to move to a virtual space in which a specific object corresponding to the virtual icon is located.

19. The mobile terminal of claim 12, wherein, in the VR mode, if the user enters a virtual space in which a specific object corresponding to the one virtual image is located, the controller displays a thumbnail image corresponding to a virtual space which the user previously visited to be overlapped on a current image.

* * * * *